United States Patent
Al Hamouz et al.

(10) Patent No.: US 10,494,472 B2
(45) Date of Patent: Dec. 3, 2019

(54) CROSSLINKED POLYDITHIOCARBAMATE, SYNTHESIS THEREOF, AND USE FOR REMOVING HEAVY METALS

(71) Applicant: King Fahd University of Petroleum and Minerals, Dhahran (SA)

(72) Inventors: Othman Charles Sadeq Al Hamouz, Dhahran (SA); Mohammed Estatie, Dhahran (SA); Tawfik Abdo Saleh Awadh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 70 days.

(21) Appl. No.: 15/856,751

(22) Filed: Dec. 28, 2017

(65) Prior Publication Data

US 2019/0202967 A1   Jul. 4, 2019

(51) Int. Cl.
| | |
|---|---|
| C02F 1/28 | (2006.01) |
| C02F 1/62 | (2006.01) |
| C02F 1/68 | (2006.01) |
| C08G 18/38 | (2006.01) |
| C08F 8/34 | (2006.01) |
| C08F 26/06 | (2006.01) |
| C08F 271/02 | (2006.01) |
| C08J 3/24 | (2006.01) |
| C08K 3/30 | (2006.01) |
| C02F 101/20 | (2006.01) |
| B01J 23/04 | (2006.01) |

(52) U.S. Cl.
CPC ......... *C08G 18/3859* (2013.01); *C02F 1/285* (2013.01); *C02F 1/62* (2013.01); *C02F 1/683* (2013.01); *C08F 8/34* (2013.01); *C08F 26/06* (2013.01); *C08F 271/02* (2013.01); *C08J 3/24* (2013.01); *C08K 3/30* (2013.01); *B01J 23/04* (2013.01); *C02F 2101/20* (2013.01); *C02F 2209/06* (2013.01); *C08K 2003/3009* (2013.01)

(58) Field of Classification Search
CPC .................................................. C08G 18/3859
USPC .................................................. 528/242, 243
See application file for complete search history.

(56) References Cited

FOREIGN PATENT DOCUMENTS

JP    S52-78224    7/1977

OTHER PUBLICATIONS

Hamouz et al; REmoval of Cd ions from wasterwater by dithiocarbamate functionalized pyrrole based terpolymers; Elsevier B.V.; Separation and Purification technology 177, 101-109. (Year: 2017).*

(Continued)

*Primary Examiner* — Duc Truong
(74) *Attorney, Agent, or Firm* — Oblon, McClelland, Maier & Neustadt, L.L.P.

(57) ABSTRACT

Crosslinked polydithiocarbamates based on 1,3,5-triazinane cores linked to pyrrole-dithiocarbamates via alkyl chains. A process for preparing these crosslinked polydithiocarbamates via a Mannich-type polycondensation of diaminoalkane, paraformaldehyde and a pyrrole compound, which is followed by additional modification of the pyrrole moiety to a pyrrole-dithiocarbamate. A method for removing heavy metals, such as Cd(II) from an aqueous solution or an industrial wastewater sample with these crosslinked polydithiocarbamates is also described.

20 Claims, 12 Drawing Sheets

(56) References Cited

OTHER PUBLICATIONS

Othman Charles S. Al Hamouz, et al. "Removal of cadium ions from wastewater by dithiocarbamate functionalized pyrrole based terpolymers", Separation and Purification Technology, vol. 177, Apr. 28, 2017, pp. 101-109.

* cited by examiner

FIG. 7A
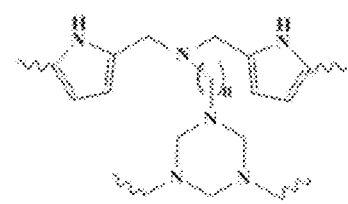
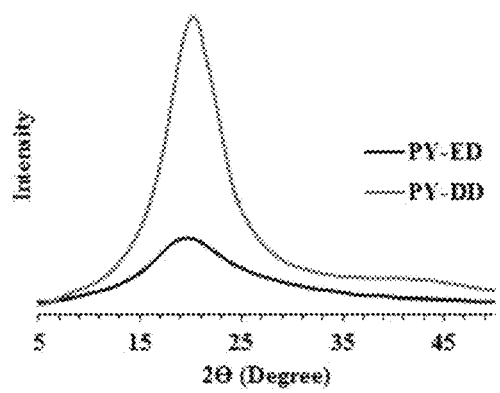
FIG. 7B
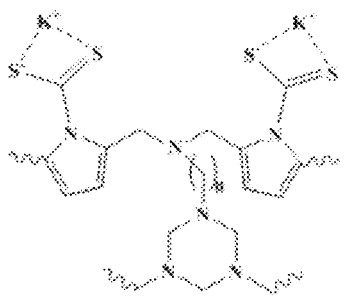
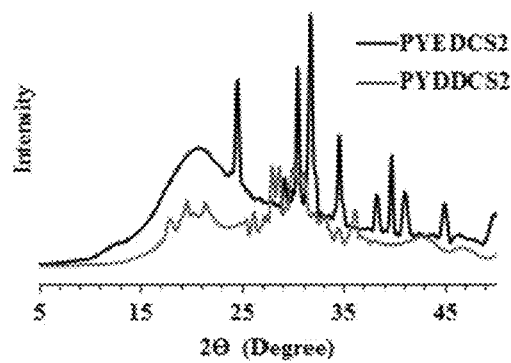

CROSSLINKED POLYDITHIOCARBAMATE, SYNTHESIS THEREOF, AND USE FOR REMOVING HEAVY METALS

STATEMENT OF FUNDING ACKNOWLEDGEMENT

This project was funded by King Abdulaziz City for Science and Technology (KACST) through project number AT-35-131 and King Fahd University of Petroleum and Minerals (KFUPM).

STATEMENT REGARDING PRIOR DISCLOSURE BY THE INVENTORS

Aspects of this technology are described in an article "Removal of cadmium ions from wastewater by dithiocarbamate functionalized pyrrole based terpolymers" published in Separation and Purification Technology, 2017, 177, 101-109, on Dec. 29, 2016, which is incorporated herein by reference in its entirety.

BACKGROUND OF THE INVENTION

Technical Field

The present invention relates to crosslinked polydithiocarbamates. More specifically, the present invention relates to crosslinked polydithiocarbamates comprising 1,3,5-triazinane cores linked to pyrrole-dithiocarbamate moieties via alkyl chains, and a method for using these crosslinked polydithiocarbamates to adsorb and remove heavy metals from contaminated aqueous solutions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water is essential to all living organisms. Any kind of contamination of water resources raises health risks to humans and many other living systems. One of the main contaminants in water resources is heavy metals (C.-G. Lee, M.-K. Song, J.-C. Ryu, C. Park, J.-W. Choi, S.-H. Lee, Application of carbon foam for heavy metal removal from industrial plating wastewater and toxicity evaluation of the adsorbent, Chemosphere, 153 (2016) 1-9; and S. Malamis, E. Katsou, T. Kosanovic, K. J. Haralambous, Combined Adsorption and Ultrafiltration Processes Employed for the Removal of Pollutants from Metal Plating Wastewater, Separation Science and Technology, 47 (2012) 983-99(6). Heavy metals are persistent contaminants due to their non-biodegradable behavior and bioaccumulation even at trace levels (P. Koedrith, H. Kim, J.-I. Weon, Y. R. Seo, Toxicogenomic approaches for understanding molecular mechanisms of heavy metal mutagenicity and carcinogenicity, International Journal of Hygiene and Environmental Health, 216 (2013) 587-598; X. Zeng, X. Xu, H. M. Boezen, X. Huo, Children with health impairments by heavy metals in an e-waste recycling area, Chemosphere, 148 (2016) 408-415; and Y.-G. Gu, Y.-P. Gao, Q. Lin, Contamination, bioaccessibility and human health risk of heavy metals in exposed-lawn soils from 28 urban parks in southern China's largest city, Guangzhou, Applied Geochemistry, 67 (2016) 52-58). Removal of these types of pollutants from wastewater is thus needed prior to release of the wastewater from industrial sites (T. Liu, X. Yang, Z.-L. Wang, X. Yan, Enhanced chitosan beads-supported FeO-nanoparticles for removal of heavy metals from electroplating wastewater in permeable reactive barriers, Water Research, 47 (2013) 6691-6700).

Cadmium is a heavy metal which is frequently used in industrial processes with applications including nickel-cadmium batteries, anticorrosive agents and pigments. Recently, cadmium has received a great deal of attention as its toxicity behavior potentially leads to various diseases such as bone damage, acute respiratory distress syndromes (ARDS) and kidney damage (L. Järup, Hazards of heavy metal contamination, British Medical Bulletin, 68 (2003) 167-182; O. Barbier, G. Jacquillet, M. Tauc, M. Cougnon, P. Poujeol, Effect of Heavy Metals on, and Handling by, the Kidney, Nephron Physiology, 99 (2005) 105-110; and J. Godt. F. Scheidig, C. Grosse-Siestrup, V. Esche, P. Brandenburg, A. Reich, D. A. Groneberg, The toxicity of cadmium and resulting hazards for human health, Journal of Occupational Medicine and Toxicology (London, England), 1 (2006) 22-22).

Various methods including precipitation, flocculation, separation using membranes, and ion exchange have been implemented to remove heavy metals from wastewater (L. Ma, Q. Wang, S. M. Islam, Y. Liu, S. Ma, M. G. Kanatzidis, Highly Selective and Efficient Removal of Heavy Metals by Layered Double Hydroxide Intercalated with the $MoS_4^{2-}$ Ion, Journal of the American Chemical Society, 138 (2016) 2858-2866; and D. R. Tonini, D. A. Gauvin, R. W. Soffel, W. P. Freeman, Achieving low mercury concentrations in chlor-alkali wastewaters, Environmental Progress, 22 (2003) 167-173). Another option for wastewater treatment is adsorption, which is still considered the best method for removing heavy metals because of its high efficiency and low cost (K. Anoop Krishnan, T. S. Anirudhan, Removal of mercury(II) from aqueous solutions and chlor-alkali industry effluent by steam activated and sulphurised activated carbons prepared from bagasse pith: kinetics and equilibrium studies, Journal of Hazardous Materials, 92 (2002) 161-183; and X. Wang, W. Deng, Y. Xie, C. Wang, Selective removal of mercury ions using a chitosan-poly(vinyl alcohol) hydrogel adsorbent with three-dimensional network structure, Chemical Engineering Journal, 228 (2013) 232-242).

Many types of materials including zeolites, biomaterials and activated carbon have been studied for their efficacy in wastewater treatment, specifically as efficient adsorbent materials for heavy metals (X. Zhao, Q. Jia, N. Song, W. Zhou, Y. Li, Adsorption of Pb(II) from an Aqueous Solution by Titanium Dioxide/Carbon Nanotube Nanocomposites: Kinetics, Thermodynamics, and Isotherms, Journal of Chemical & Engineering Data, 55 (2010) 4428-4433; W. Du. L. Yin, Y. Zhuo, Q. Xu, L. Zhang, C. Chen, Catalytic Oxidation and Adsorption of Elemental Mercury over $CuCl_2$-Impregnated Sorbents, Industrial & Engineering Chemistry Research, 53 (2014) 582-591; and A. B. Albadarin, A. a. H. Al-Muhtaseb. N. A. Al-laqtah, G. M. Walker, S. J. Allen, M. N. M. Ahmad, Biosorption of toxic chromium from aqueous phase by lignin: mechanism, effect of other metal ions and salts, Chemical Engineering Journal, 169 (2011) 20-30, each incorporated herein by reference in their entirety). Polymeric materials with good performance are also considered one of the most relevant adsorbent materials. The adsorption performance of a polymeric material is directly proportional to its functionality. It has been reported that sulfides (N. Ding, M. G. Kanatzidis, Selective incarceration of caesium ions by Venus flytrap action of a flexible framework sulfide, Nat Chem, 2 (2010) 187-191; and M. Shafaei-Fallah, J. He, A. Rothenberger, M. G. Kanatzidis, Ion-Exchangeable Cobalt Polysulfide Chalcogel. Journal of the American Chemical Society, 133 (2011) 1200-1202, each incorporated herein by reference in their entirety) and other adsorbents containing sulfur moieties such as mercaptobenzothiazoles (H. Parham, B. Zargar, R. Shiralipour, Fast and efficient removal of mercury from water samples using magnetic iron oxide nanoparticles modified with 2-mercaptobenzothiazole, Journal of Hazardous Materials, 205-206 (2012) 94-100, incorporated herein by reference in its entirety), dithiocarbamates, thiols (J. D. Merrifield, W. G. Davids, J. D. MacRae, A. Amirbahman, Uptake of mercury by thiol-grafted chitosan gel beads, Water Research, 38 (2004) 3132-3138, incorporated herein by reference in its entirety), and benzoylthiourea (V. Antochshuk O. Olkhovyk, M. Jaroniec, I.-S. Park, R. Ryoo, Benzoylthiourea-Modified Mesoporous Silica for Mercury(II) Removal, Langmuir, 19 (2003) 3031-3034, incorporated herein by reference in its entirety) demonstrate excellent efficiency in wastewater treatment due to strong covalent bond formation between the sulfur moiety and heavy metal.

In the past few decades researchers have designed many new organic polymers containing sulfur moieties, e.g. dithiocarbamate (DTC) moieties. Recently, efforts have been made towards surface modification with DTCs on natural or synthetic composites and nanoparticles for wastewater treatment (A. Farrukh, A. Akram, A. Ghaffar, S. Hanif, A. Hamid, H. Duran, B. Yameen, Design of Polymer-Brush-Grafted Magnetic Nanoparticles for Highly Efficient Water Remediation, ACS Applied Materials & Interfaces, 5 (2013) 3784-3793, incorporated herein by reference in its entirety). Several research groups reported the modification of organic polymers with dithiocarbamate functionality. Usually, these polymers are modified through a conversion of a primary or secondary amine functionality to a dithiocarbamate using carbon disulfide (J. Gaur, S. Jain, R. Bhatia, A. Lal, N. K. Kaushik, Synthesis and characterization of a novel copolymer of glyoxal dihydrazone and glyoxal dihydrazone bis (dithiocarbamate) and application in heavy metal ion removal from water, Journal of Thermal Analysis and Calorimetry, 112 (2013) 1137-1143, and N. Kobayashi, A. Osawa, T. Fujisawa, Sulfur-containing Polymers. XIII. The Synthesis and Properties of Soluble Polydithiocarbamates, Bull. Chem. Soc. Jpn., 47 (1974) 2287-2291, each incorporated herein by reference in their entirety). An example of the synthesis of dithiocarbamate-modified polymers (DTCP) was reported by Liu et al. In their reported work, triethylenetetramine was grafted on a co-polymer of dimethyldiallylammonium chloride and acrylamide where the amine moieties were changed into DTC groups (L. Liu, J. Wu, X. Li, Y. Ling, Synthesis of poly(dimethyldiallylammonium chloride-co-acrylamide)-grait-triethyleneteramine-dithiocarbamate and its removal performance and mechanism of action towards heavy metal ions, Separation and Purification Technology, 103 (2013) 92-100, incorporated herein by reference in its entirety). In most cases, the DTCP's could be separated from the reaction mixture upon precipitation using acetone (E. Almirall, A. Fragoso, R. Cao, Molecular recognition of a self-assembled monolayer of a polydithiocarbamate derivative of β-cyclodextrin on silver, Electrochemistry Communications, 1 (1999) 10-13, incorporated herein by reference in its entirety). Despite these recent advances there is still a need to develop more efficient polymer systems for enhanced heavy metal removal in aqueous solutions.

In view of the forgoing, one objective of the present disclosure is to introduce crosslinked polydithiocarbamate polymers built on 1,3,5-triazinane cores linked to pyrrole-dithiocarbamates via alkyl chains. Another object of the present disclosure is to provide a process for synthesizing the crosslinked polydithiocarbamate via a Mannich-type polycondensation of a diaminoalkane, paraformaldehyde and a pyrrole compound, followed by an additional modification of the pyrrole to pyrrole-dithiocarbamate. The present disclosure further aims to describe a method for removing heavy metals, such as Cd(II) ions from an aqueous solution by employing the adsorbing properties of the crosslinked polydithiocarbamates described herein.

BRIEF SUMMARY OF THE INVENTION

According to a first aspect, the present disclosure relates to a crosslinked polydithiocarbamate of Formula (I)

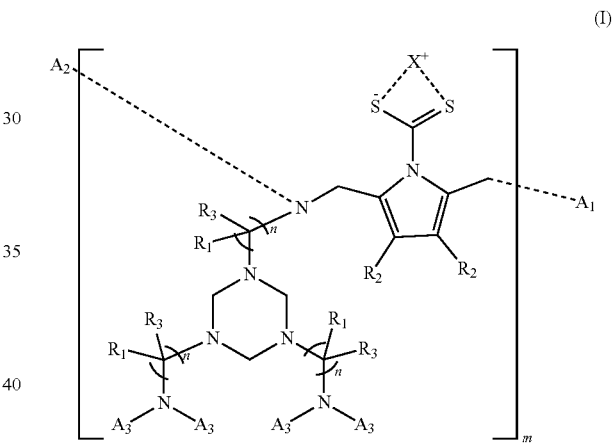

(I)

or a salt thereof, a solvate thereof, a tautomer thereof, a stereoisomer thereof, or a mixture thereof wherein (i) $R_1$ is selected from the group consisting of a hydrogen, an optionally substituted alkyl, an optionally substituted cycloalkyl, an optionally substituted aryl, and an optionally substituted arylalkyl, (ii) each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, (iii) $R_3$ is selected from the group consisting of a hydrogen, an optionally substituted alkyl, an optionally substituted cycloalkyl, an optionally substituted aryl, and an optionally substituted arylalkyl, (iv) X is an alkali metal cation, (v) n is a positive integer in the range of 2-16, (vi) m is a positive integer in the range of 2-10000, (vii) $A_1$ forms a bond to $A_2$ of another monomer unit, and (viii) each $A_3$ is independently a hydrogen, or forms a bond to $A_1$ of another monomer unit.

In one embodiment, the crosslinked polydithiocarbamate is

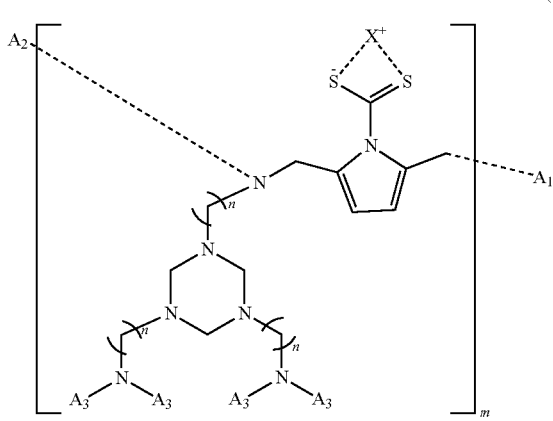

(II)

or a salt thereof, a solvate thereof, or a mixture thereof wherein (i) X is an alkali metal cation, (ii) n is a positive integer in the range of 2-10, (iii) m is a positive integer in the range of 2-10000, (iv) $A_1$ forms a bond to $A_2$ of another monomer unit, and (v) each $A_3$ is independently a hydrogen, or forms a bond to A of another monomer unit.

In one embodiment, X is K.

In one embodiment, the crosslinked polydithiocarbamate exhibits a semi-crystalline structure.

According to a second aspect, the present disclosure relates to a method of synthesizing the crosslinked polydithiocarbamate of claim 1, comprising reacting a diaminoalkane of Formula (V)

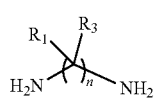

(V)

or a salt, solvate, tautomer or stereoisomer thereof, with a pyrrole compound of Formula (VI)

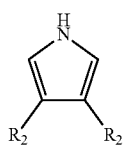

(VI)

or a salt, solvate, tautomer or stereoisomer thereof, and paraformaldehyde to form a crosslinked polymeric resin wherein (i) $R_1$ is selected from the group consisting of a hydrogen, an optionally substituted alkyl, an optionally substituted cycloalkyl, an optionally substituted aryl, and an optionally substituted arylalkyl, (ii) $R_3$ is selected from the group consisting of a hydrogen, an optionally substituted alkyl, an optionally substituted cycloalkyl, an optionally substituted aryl, and an optionally substituted arylalkyl, (iii) each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, and (iv) n is a positive integer in the range of 2-16, and reacting the crosslinked polymeric resin with carbon disulfide in the presence of an alkali metal hydroxide to form the crosslinked polydithiocarbamate.

In one embodiment, the molar ratio of the paraformaldehyde to the pyrrole compound is in the range of 1:1 to 10:1.

In one embodiment, the molar ratio of the diaminoalkane to the pyrrole compound is in the range of 1:1 to 5:1.

In one embodiment, each $R_1$, $R_2$ and $R_3$ is a hydrogen, n is selected from 2, 4, 8 and 10, and wherein the pyrrole compound is pyrrole, and the diaminoalkane is at least one selected from the group consisting of 1,2-diaminoethane, 1,4-diaminobutane, 1,8-diaminooctane, and 1,10-diaminodecane.

According to a third aspect, the present disclosure relates to a method for removing a heavy metal from an aqueous solution, comprising (i) contacting the aqueous solution having an initial concentration of the heavy metal with the crosslinked polydithiocarbamate to form a mixture, and (ii) filtering the mixture to obtain a heavy metal loaded crosslinked polydithiocarbamate and an aqueous solution having a reduced concentration of the heavy metal compared to the initial concentration.

In one embodiment, the heavy metal is an ion of at least one heavy metal selected from the group consisting of Pb, Cd, As, Cu, Ni, Co, Mn, and Cr.

In one embodiment, the heavy metal is Cd(II).

In one embodiment, the aqueous solution has a pH in the range of 2 to 8.

In one embodiment, the initial concentration of the heavy metal in the aqueous solution ranges from 50 µg $L^{-1}$ to 5000 µg $L^{-1}$.

In one embodiment, the crosslinked polydithiocarbamate is present at a concentration in the range of 0.1-10 g per liter of the aqueous solution during the contacting.

In one embodiment, the crosslinked polydithiocarbamate is contacted with the aqueous solution for 0.1-24 hours.

In one embodiment, the crosslinked polydithiocarbamate is contacted with the aqueous solution at a temperature in the range of 20° C. to 80° C.

In one embodiment, the crosslinked polydithiocarbamate has an adsorption capacity in the range of 100-5000 µg of heavy metal per gram of the crosslinked polydithiocarbamate.

In one embodiment, greater than 30% of a total mass of the heavy metal is removed from the aqueous solution.

In one embodiment, each $R_1$, $R_2$, and $R_3$ is a hydrogen and n is 2, the aqueous solution has Cd(II) and at least one additional heavy metal ion, which is an ion of at least one heavy metal selected from the group consisting of Pb, As, Cu, Ni, Co, Mn, and Cr, and greater than 95% of a total mass of Cd(II) is removed from the aqueous solution.

In one embodiment, the method further comprises treating the heavy metal loaded crosslinked polydithiocarbamate with an acid to desorb the heavy metal and form a regenerated crosslinked polydithiocarbamate, and using the regenerated crosslinked polydithiocarbamate to remove a heavy metal from an aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7A is an overlay of powder X-ray diffraction (PXRD) patterns of crosslinked polymeric resins PY-ED and PY-DD, which are synthetic precursors to crosslinked polydithiocarbamate of Formula (I) wherein each $R_1$, $R_2$, and $R_3$ is —H, and n=2 or 10, respectively.

FIG. 7B is an overlay of powder X-ray diffraction (PXRD) patterns of crosslinked polydithiocarbamate of Formula (I) wherein each $R_1$, $R_2$, and $R_3$ is —H, and n is 2 (PYEDCS2) or 10 (PYDDCS2).

DETAILED DESCRIPTION OF THE EMBODIMENTS

Figure 1:
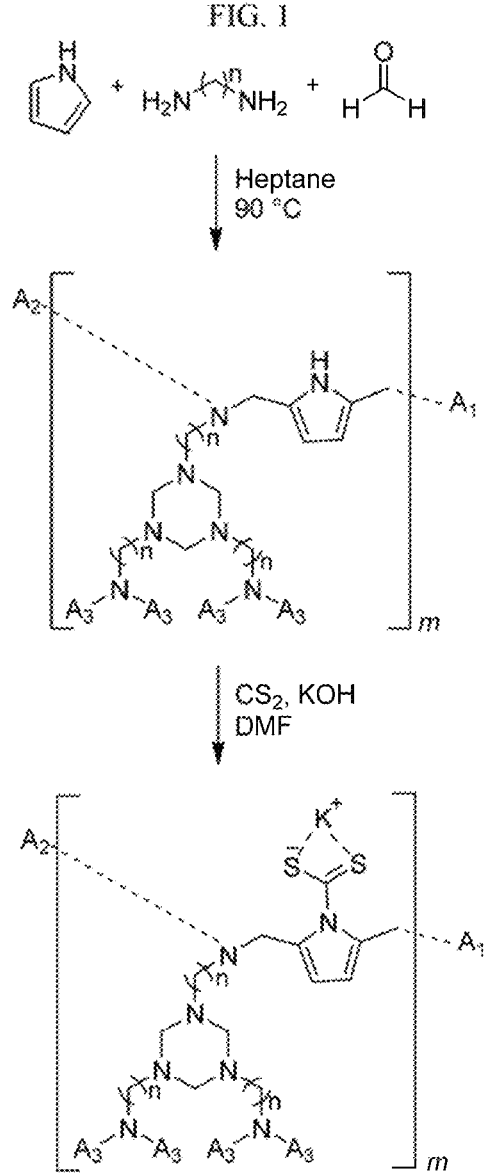
FIG. 1 is a synthetic process of crosslinked polydithiocarbamate of Formula (I) wherein each $R_1$, $R_2$, and $R_3$ is —H.

Embodiments of the present disclosure will now be described more fully hereinafter with reference to the accompanying drawings, in which some, but not all embodiments of the disclosure are shown. The present disclosure will be better understood with reference to the following definitions.

According to a first aspect, the present disclosure relates to a crosslinked polydithiocarbamate of Formula (I)

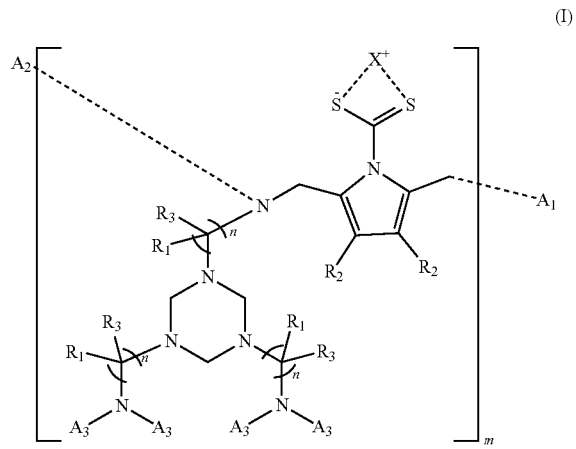

or a salt thereof, a solvate thereof, a tautomer thereof, a stereoisomer thereof, or a mixture thereof wherein (i) $R_1$ is selected from the group consisting of a hydrogen, an optionally substituted alkyl, an optionally substituted cycloalkyl, an optionally substituted aryl, and an optionally substituted arylalkyl, (ii) each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, (iii) $R_3$ is selected from the group consisting of a hydrogen, an optionally substituted alkyl, an optionally substituted cycloalkyl, an optionally substituted aryl, and an optionally substituted arylalkyl, (iv) X is an alkali metal cation, (v) n is a positive integer in the range of 2-16, (vi) m is a positive integer in the range of 2-10000, (vii) $A_1$ forms a bond to $A_2$ of another monomer unit, and (viii) each $A_3$ is independently a hydrogen, or forms a bond to $A_1$ of another monomer unit.

As represented by Formula (I), the crosslinked polydithiocarbamate of the current disclosure is generally described as a polymer formed by a Mannich-type polycondensation with 1,3,5-triazinane cores linked via terminal amino groups through a pyrrole-dithiocarbamate moiety and an alkyl linker. Formula (I) may represent the smallest repeating unit of the crosslinked polydithiocarbamate with $A_1$ forming a bond to an $A_2$ group of another repeating unit, and $A_3$ being a hydrogen or forming a bond to an $A_1$ group of another repeating unit. The 1,3,5-triazinane core may be represented by Formula (III)

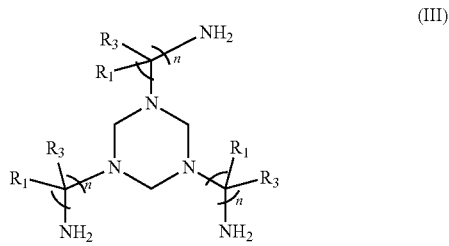

wherein (i) $R_1$ is selected from the group consisting of a hydrogen, an optionally substituted alkyl, an optionally substituted cycloalkyl, an optionally substituted aryl, and an optionally substituted arylalkyl, (ii) $R_3$ is selected from the group consisting of a hydrogen, an optionally substituted alkyl, an optionally substituted cycloalkyl, an optionally substituted aryl, and an optionally substituted arylalkyl, and (iii) n is a positive integer in the range of 2-16. In at least one embodiment, the 1,3,5-triazinane core is a product of cyclotrimerization of imines formed by a diaminoalkane and an aldehyde.

As used herein the term "repeat unit" or "repeating unit" refers to a part of the polymer or resin whose repetition would produce the complete polymer chain (including or excluding the end groups) by linking the repeating units together successively along the chain. Monomers are molecules which can undergo polymerization, thereby contributing constitutional repeating units to the structures of a macromolecule or polymer. The process by which monomers combine end to end to form a polymer is referred to herein as "polymerization" or "polycondensation". As used herein a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc. As used herein, "crosslinking", "cross-linking", "crosslinked", "cross-linked", a "crosslink", or a "cross-link" refers to polymers and resins containing branches that connect polymer chains via bonds that link one polymer chain to another. The crosslink may be an atom, a group of atoms, or a number of branch points connected by bonds, groups of atoms, or polymer chains. In the majority of cases, a crosslink is a covalent bond but the term may also describe other forms of bonding, e.g., ionic bonds and mechanical bonds. The crosslinking can alter the physical and mechanical properties of the polymer. Crosslinking may be formed by chemical reactions that are initiated by heat, pressure, change in pH, and/or radiation, with or without the presence of a cross-linking agent and/or catalyst.

As used herein, the terms "compound" and "complex" refer to a chemical entity, whether in the solid, liquid or gaseous phase, as well as in a crude mixture or purified and isolated form. The chemical transformations and/or reactions described herein are envisaged to proceed via standard laboratory and experimental techniques in regard to performing the reaction as well as standard purification, isolation and characterization protocols known to those of ordinary skill in the art.

As used herein, the term "salt" refers to derivatives of the disclosed compounds, monomers or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts include, but are not limited to, the conventional non-toxic salts or the thiocarbamate salts of the parent compound formed, for example, from non-toxic inorganic or organic acids. Exemplary conventional non-toxic salts include those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic and mixtures thereof and the like. Further, salts of carboxylic acid containing compounds may include cations such as lithium, sodium, potassium, magnesium, and the like. The salts of the present disclosure can be synthesized from the parent compound that contains a basic or acidic moiety by conventional chemical methods. Generally such salts can be prepared by reacting the free acid or base forms of these compounds with a stoichiometric amount of the appropriate base or acid in water or in an organic solvent, or in a mixture of the two; generally non-aqueous media like ether, ethyl acetate, ethanol, isopropanol, or acetonitrile are preferred. In a preferred embodiment, the crosslinked polydithiocarbamate of the present disclosure may comprise dithiocarbamate salts of the general formula —$CS_2^-X^+$. In this formula, X is a counter ion, preferably Li$^+$, Na$^+$, K$^+$, or other suitable monocations, most preferably X is K$^+$.

As used herein, the term "solvate" refers to a physical association of a compound, monomer or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvates include, but are not limited to, hydrates ethanolates, methanolates, isopropanolates and mixtures thereof. Methods of solvation are generally known to those of ordinary skill in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), enamine and enamine and anomers of reducing sugars.

Prototropy or prototropic tautomerism refers to the relocation of a proton. Prototropy may be considered a subset of acid base behavior. Prototropic tautomers are sets of isomeric protonation states with the same empirical formula and total charge. Tautomerizations may be catalyzed by bases (deprotonation, formation of an enolate or delocalized anion, and protonation at a different position of the anion) and/or acids (protonation, formation of a delocalized cation and deprotonation at a different position adjacent to the cation). Two additional subcategories of tautomerization include annular tautomerism, wherein a proton can occupy two or more positions of a heterocyclic system, and ring-chain tautomerism, wherein the movement of a proton is accompanied by a change from an open structure to a ring. Valence tautomerism is a type of tautomerism in which single and/or double bonds are rapidly formed and ruptured, without migration of atoms or groups. It is distinct from prototropic tautomerism, and involves processes with rapid reorganization of bonding electrons, such as open and closed forms of certain heterocycles, such as azide-tetrazole or mesoionic munchnone-acylamino ketene. Valence tautomerism requires a change in molecular geometry unlike canonical resonance structures or mesomers. In terms of the present disclosure, the tautomerism may refer to prototropic tautomerism, annular tautomerism, ring-chain tautomerism, valence tautomerism or mixtures thereof.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-)isomers, an non-enantiomeric optical isomers. Diastereomers seldom have the same physical properties. In terms of the present disclosure, stereoisomers may refer to enantiomers, diastereomers or both.

Conformers (rotamers), or conformational isomerism refers to a form of isomerism that describes the phenomenon of molecules with the same structural formula but with different shapes due to rotations about one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the ring systems, stereogenic centers, and the like can all be present in the compounds, and all such stable isomers are contemplated in the present disclosure. Cis- and trans- (or E- and Z-) stereoisomers of the compounds of the present disclosure wherein rotation about the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically C$_1$ to C$_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The term "aryloxy", as used herein, includes, but is not limited to, phenoxy, and phenoxy moieties substituted with halogen, alkyl, alkoxy, and/or haloalkyl such as fluoromethyl, chloromethyl, bromomethyl, iodomethyl, 2-fluoroethyl, 2-chloroethyl, 2-bromoethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl.

In a preferred embodiment, R$_1$ is selected from the group consisting of a hydrogen, an optionally substituted alkyl, an optionally substituted cycloalkyl, an optionally substituted aryl, and an optionally substituted arylalkyl, most preferably R$_1$ is a hydrogen.

In a preferred embodiment, R$_3$ is selected from the group consisting of a hydrogen, an optionally substituted alkyl, an optionally substituted cycloalkyl, an optionally substituted aryl, and an optionally substituted arylalkyl, most preferably R$_3$ is a hydrogen.

In a preferred embodiment, each R$_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, most preferably each R$_2$ is a hydrogen.

In one embodiment, the value of n denotes an alkyl chain of —CR$_1$R$_3$— groups. In a preferred embodiment, n is a positive integer in the range of 2-16, preferably 3-14, preferably 4-12, preferably 5-10, preferably n is a positive integer equal to 2, 4, 8, or 10. In some embodiments, the alkyl chain may have more than 16 carbon atoms, e.g. 18, 20, or 22 carbon atoms.

As used herein, the term "degree of polymerization" refers to the number of repeating units in a polymer. In a preferred embodiment, degree of polymerization m is a positive integer in the range of 2-10000, preferably 2-5000, preferably 2-2500, preferably 2-1000, preferably 2-500, preferably 2-400, preferably 3-300, preferably 4-275, preferably 5-250, preferably 10-200, preferably 15-150, preferably 20-100, preferably 25-50. It is equally envisaged that values for m may fall outside of these ranges and still provide suitable crosslinked polydithiocarbamates of Formula (I). In a preferred embodiment, the crosslinked polydithiocarbamate of the present disclosure may have a wide molecular weight distribution. In one embodiment, the crosslinked polydithiocarbamate of the present disclosure has an average molecular weight of 4-200 kDa, preferably 10-150 kDa, preferably 10-100 kDa, preferably 10-75 kDa, more preferably 10-50 kDa, more preferably 20-35 kDa.

In a preferred embodiment, the crosslinked polydithiocarbamate is

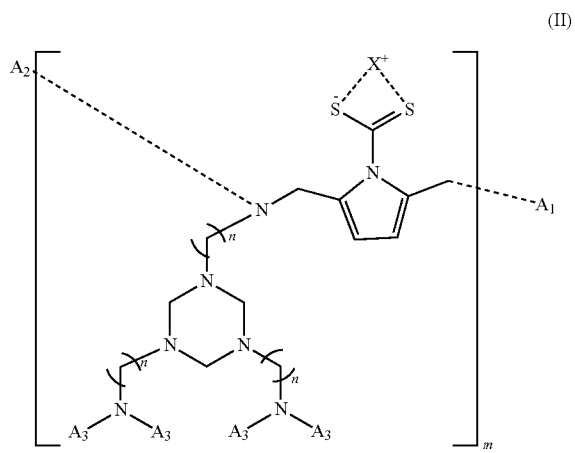

(II)

or a salt thereof, a solvate thereof, or a mixture thereof wherein (i) X is an alkali metal cation, (ii) n is a positive integer in the range of 2-10, (iii) m is a positive integer in the range of 2-10000, (iv) $A_1$ forms a bond to $A_2$ of another monomer unit, and (v) each $A_3$ is independently a hydrogen, or forms a bond to $A_1$ of another monomer unit.

In a more preferred embodiment, the crosslinked polydithiocarbamate is

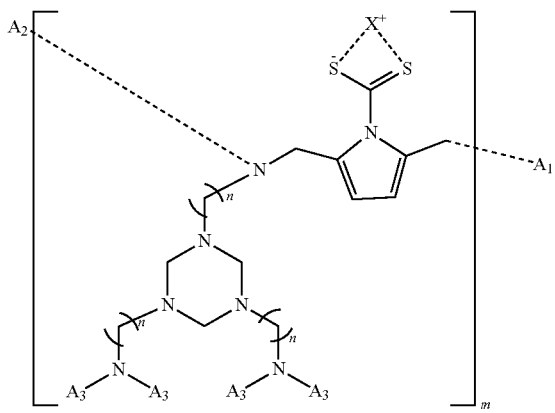

or a salt thereof, a solvate thereof, or a mixture thereof wherein (i) n is 2, 4, 8 or 10, (ii) m is a positive integer in the range of 2-10000, (iii) $A_1$ forms a bond to $A_2$ of another monomer unit, and (iv) each $A_3$ independently forms a bond to A of another monomer unit.

The crosslinked polydithiocarbamate of the present disclosure is generally described as a polymer formed by a Mannich-type polycondensation with 1,3,5-triazinane cores linked via terminal amino groups through a pyrrole-dithiocarbamate moiety and an alkyl linker. In certain embodiments, one or more of the pyrrole-dithiocarbamate rings may not be fully substituted at 2- and 5-positions. For example, some pyrrole-dithiocarbamate rings may only have 2-position substituted, or 5-position substituted. Preferably, the pyrrole-dithiocarbamate ring has 2- and 5-positions substituted. In some embodiments, one or more $A_3$ groups are a hydrogen, as such one or more of the terminal amino groups of the 1,3,5-triazinane core may not be fully substituted.

In certain embodiments, the crosslinked polydithiocarbamate may be additionally represented by Formula (IV)

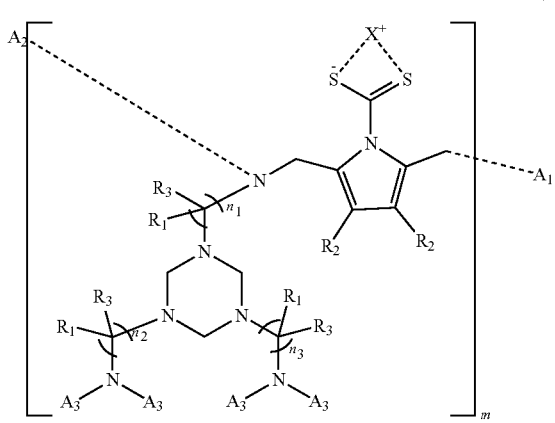

(IV)

or a salt thereof, a solvate thereof, a tautomer thereof, a stereoisomer thereof, or a mixture thereof wherein (i) $R_1$ is selected from the group consisting of a hydrogen, an optionally substituted alkyl, an optionally substituted cycloalkyl, an optionally substituted aryl, and an optionally substituted arylalkyl, (ii) $R_3$ is selected from the group consisting of a hydrogen, an optionally substituted alkyl, an optionally substituted cycloalkyl, an optionally substituted aryl, and an optionally substituted arylalkyl, (iii) each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, (iv) X is an alkali metal cation, (v) $n_1$, $n_2$ and $n_3$ are independently a positive integer in the range of 2-16, (vi) m is a positive integer in the range of 2-10000, (vii) $A_1$ forms a bond to $A_2$ of another monomer unit, and (viii) each $A_3$ is independently a hydrogen, or forms a bond to $A_t$ of another monomer unit.

In certain embodiments, the crosslinked polydithiocarbamate of the present disclosure may comprise $n_1$, $n_2$ and $n_3$ of different values with $n_1 \neq n_2 \neq n_3$, in other embodiments $n_1 = n_2 \neq n_3$, or $n_1 \neq n_2 = n_3$. In a more preferred embodiment, $n_1 = n_2 = n_3$.

A polymer may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymers may be characterized by their degree of crystallinity, ranging from zero for a completely amorphous (non-crystalline) polymer to one for a theoretical completely crystalline polymer.

The crosslinked polydithiocarbamate described herein may contain both crystalline and amorphous regions. In a preferred embodiment, the crosslinked polydithiocarbamate of the present disclosure exhibits a semi-crystalline structure. In a preferred embodiment, the crosslinked polydithiocarbamate of the present disclosure has a degree of crystallinity in the range of 0.1-0.8, preferably 0.2-0.6, preferably 0.3-0.5. The semi-crystalline nature of the crosslinked polydithiocarbanate described herein may result from a high chelating ability of the polymer or dithiocarbamate moieties towards metal cations. Chelations of suitable cations, such as $K^+$ and $Cd^{2+}$, in between the long polymer chains may result in a form of chain stacking by inter chain chelation. In some embodiments, a crosslinked polydithiocarbamate with longer diaminoalkyl chains (larger n value) has a higher degree of crystallinity. Methods for evaluating the degree of crystallinity include, but are not limited to differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM).

As used herein, a Mannich-type reaction or a Mannich-type polycondensation refers to a multi-component condensation of a nonenolizable aldehyde (e.g. paraformaldehyde), a primary or secondary amine or ammonia, and an enolizable compound such as a carbonyl, a nitrile, and an electron-rich heterocycle, e.g., furan, pyrrole, indole and thiophene. (B. List, The Direct Catalytic Asymmetric Three-Component Mannich Reaction, Journal of the American Chemical Society, 122 (2000) 9336-9337, incorporated herein by reference in its entirety) The Mannich-type reaction often involves a two-step reaction: addition of the amine or ammonia to the carbonyl carbon of the paraformaldehyde to form an electrophilic iminium ion, which is followed by attack of the electrophile by the enolizable compound. In one embodiment, reacting the diaminoalkane, paraformaldehyde and the pyrrole compound to form the crosslinked polymeric resin is achieved through a Mannich-type polycondensation.

As used herein, a cyclotrimerization reaction refers to a cycloaddition reaction of three unsaturated molecules (or parts of the same molecule) combine with the formation of a cyclic adduct. Notable cycloadditions include Diels-Alder reaction, alkyne trimerisation, and nitrone-olefin cycloaddition. In one or more embodiments, the 1,3,5-triazinane core is generated via a cyclotrimerization reaction of —C=N— functionalities on imine intermediates formed by a diaminoalkane and paraformaldehyde.

According to a second aspect, the present disclosure relates to a method of synthesizing the crosslinked polydithiocarbamate, comprising reacting a diaminoalkane with a pyrrole compound and paraformaldehyde to form a crosslinked polymeric resin, and reacting the crosslinked polymeric resin with carbon disulfide in the presence of an alkali metal hydroxide to form the crosslinked polydithiocarbamate.

In a preferred embodiment, the diaminoalkane has the following Formula (V)

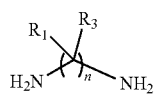

(V)

or a salt, solvate, tautomer or stereoisomer thereof, wherein $R_1$ is selected from the group consisting of a hydrogen, an optionally substituted alkyl, an optionally substituted cycloalkyl, an optionally substituted aryl, and an optionally substituted arylalkyl, $R_3$ is selected from the group consisting of a hydrogen, an optionally substituted alkyl, an optionally substituted cycloalkyl, an optionally substituted aryl, and an optionally substituted arylalkyl, and n is a positive integer in the range of 2-16, preferably 3-14, preferably 4-12, preferably 5-10, preferably n is a positive integer equal to 2, 4, 8, or 10. In a more preferred embodiment, the diaminoalkane of Formula (V) is

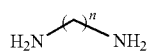

wherein n is the same as described above, and the diaminoalkane is at least one selected from the group consisting of 1,2-diaminoethane, 1,4-diaminobutane, 1,8-diaminooctane, and 1,10-diaminodecane.

In one embodiment, the pyrrole compound has the following Formula (VI)

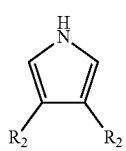

(VI)

or a salt, solvate, tautomer or stereoisomer thereof, wherein each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen. In a preferred embodiment, the pyrrole compound of Formula (VI) is pyrrole (i.e., $R_2$ is H).

In a preferred embodiment, reacting a diaminoalkane of Formula (V) with a pyrrole compound of Formula (VI) and paraformaldehyde forms a crosslinked polymeric resin of Formula (VII)

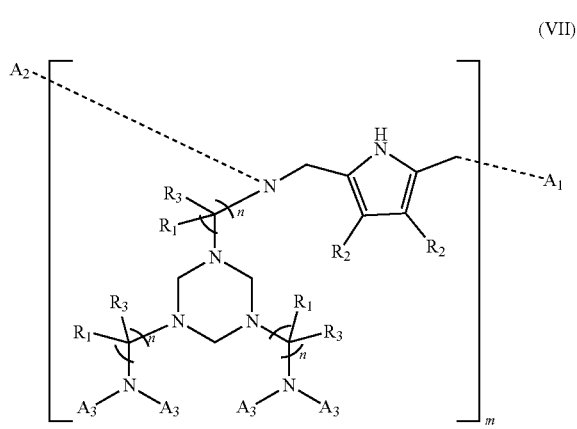

(VII)

or a salt thereof, a solvate thereof, a tautomer thereof, a stereoisomer thereof, or a mixture thereof wherein (i) $R_1$ is selected from the group consisting of a hydrogen, an optionally substituted alkyl, an optionally substituted cycloalkyl, an optionally substituted aryl, and an optionally substituted arylalkyl, (ii) $R_3$ is selected from the group consisting of a hydrogen, an optionally substituted alkyl, an optionally substituted cycloalkyl, an optionally substituted aryl, and an optionally substituted arylalkyl, (iii) each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, (iv) n is a positive integer in the range of 2-16, (v) m is a positive integer in the range of 2-10000, (vi) $A_1$ forms a bond to $A_2$ of another monomer unit, and (vii) each $A_3$ is independently a hydrogen, or forms a bond to $A_1$ of another monomer unit.

In a preferred embodiment, reacting the diaminoalkane with the pyrrole compound and paraformaldehyde to form the crosslinked polymeric resin is performed in a non-polar solvent, preferably in n-heptane. Exemplary additional non-polar solvents that may be used in addition to, or in lieu of n-heptane include, but are not limited to pentane, cyclopentane, hexane, cyclohexane, benzene, toluene, 1,4-dioxane, chloroform, diethyl ether, dichloromethane, and mixtures thereof. It is equally envisaged that the reaction may be adapted to be performed in a polar aprotic solvent (i.e. tetrahydrofuran, ethyl acetate, acetone, dimethylformamide, acetonitrile, dimethyl sulfoxide, nitromethane and propylene carbonate), a polar protic solvent (i.e. methanol, formic acid, n-butanol, isopropanol, n-propanol, ethanol, acetic acid and water), or mixtures thereof. In a preferred embodiment, the reaction is performed at a concentration of the pyrrole compound in the range of 0.01-10.0 M, preferably 0.05-5.0 M, preferably 0.10-2.0 M, preferably 0.20-1.0 M, preferably 0.4-0.6 M.

In a preferred embodiment, the diaminoalkane is present in a reaction of forming a crosslinked polymeric resin in a molar excess to the pyrrole compound. In one embodiment, the molar ratio of the diaminoalkane to the pyrrole compound is in the range of 1:1 to 5:1, preferably 1.5:1 to 4.5:1, preferably 2:1 to 4:1, preferably 2.5:1 to 3.5:1, or about 3:1. In a preferred embodiment, the paraformaldehyde is present in a reaction of forming a crosslinked polymeric resin in a molar excess to the pyrrole compound. In one embodiment, the molar ratio of the paraformaldehyde to the pyrrole compound is in the range of 1:1 to 10:1, preferably 2:1 to 9:1, preferably 3:1 to 8:1, preferably 4:1 to 6:1, or about 5:1.

In a preferred embodiment, the reaction of forming a crosslinked polymeric resin is performed under mechanical stirring, preferably a magnetic stirrer at a temperature of up to 115° C., preferably 20-110° C., preferably 40-105° C., preferably 60-100° C., preferably 80-95° C., or about 90° C. and has a reaction time of up to 48 hours, preferably 2-44 hours, preferably 8-38 hours, preferably 12-32 hours, preferably 18-30 hours, or about 24 hours. In a preferred embodiment, the crosslinked polymeric resin is collected as a resinous material that may be separated (filtered off), crushed, soaked and washed in water and acetone, and then filtered and dried. In one embodiment, the resinous material may be dried under vacuum at 20-100° C., preferably 40-80° C., or about 60° C. until a constant weight is achieved. In a preferred embodiment, the reaction of forming a crosslinked polymeric resin has a product yield of at least 50%, preferably at least 60%, preferably at least 65%, preferably at least 70%, preferably at least 75%, preferably at least 80%, preferably at least 85%, preferably at least 90%. The product yield is calculated as (mass of product/mass of reactants)×100%.

In one or more embodiments, forming a crosslinked polydithiocarbamate involves a reaction between the crosslinked polymeric resin of Formula (VII) and carbon disulfide in the presence of an alkali metal hydroxide. The reaction is well known in the literature and to those of ordinary skill in the art. Many primary and secondary amines and heterocycles with acidic —NH— moieties are known to react with carbon disulfide in the presence of alkali hydroxides and form dithiocarbamate salts. In a preferred embodiment, the alkali metal hydroxide is a strong base. Exemplary alkali metal hydroxides include, but are not limited to, lithium hydroxide, sodium hydroxide, potassium hydroxide, and mixtures thereof. In a preferred embodiment, the alkali metal hydroxide is potassium hydroxide.

In a preferred embodiment, reacting the crosslinked polymeric resin of Formula (VII) with carbon disulfide in the presence of an alkali metal hydroxide is performed in a polar aprotic solvent, preferably in dimethylformamide. Exemplary additional polar aprotic solvents that may be used in addition to, or in lieu of dimethylformamide include, but are not limited to, tetrahydrofuran, ethyl acetate, acetone, acetonitrile, dimethyl sulfoxide, nitromethane, propylene carbonate, and mixtures thereof. It is equally envisaged that the reaction may be adapted to be performed in a non-polar solvent (i.e. n-heptane, pentane, cyclopentane, hexane, cyclohexane, benzene, toluene, 1,4-dioxane, chloroform, diethyl ether, and dichloromethane), a polar protic solvent (i.e. methanol, formic acid, n-butanol, isopropanol, n-propanol, ethanol, acetic acid and water), or mixtures thereof. In a preferred embodiment, a concentration of the crosslinked polymeric resin of Formula (VII) in the aforementioned reaction is in the range of 0.1-10.0 M, preferably 0.25-7.5 M, preferably 0.5-5.0 M, preferably 0.75-2.5 M, preferably 1.0-1.50 M.

In a preferred embodiment, the carbon disulfide is present in the aforementioned reaction in a molar excess to the crosslinked polymeric resin of Formula (VII). In a preferred embodiment, the molar ratio of the carbon disulfide to the crosslinked polymeric resin of Formula (VII) is in the range of 2:1 to 12:1, preferably 4:1 to 10:1, preferably 5:1 to 8:1, or about 6:1. In a preferred embodiment, the alkali metal hydroxide is present in the aforementioned reaction in a molar excess to the crosslinked polymeric resin of Formula (VII). In a preferred embodiment, the molar ratio of the alkali metal hydroxide to the crosslinked polymeric resin of Formula (VII) is in the range of 2:1 to 12:1, preferably 4:1 to 10:1, preferably 5:1 to 8:1, or about 6:1. In a preferred embodiment, the molar ratio of the alkali metal hydroxide to the carbon disulfide is in the range of 0.5:1 to 3:1, preferably 0.75:1 to 2:1, preferably 0.9:1 to 1.5:1, or about 1:1.

In a preferred embodiment, reacting the crosslinked polymeric resin of Formula (VII) with carbon disulfide in the presence of an alkali metal hydroxide is performed under mechanical stirring, preferably by a magnetic stirrer at a temperature of up to 80° C., preferably 10-60° C., preferably 15-40° C., preferably 20-30° C., preferably 22-28° C., or about 25° C. and has a stirred reaction time of up to 96 hours, preferably 12-90 hours, preferably 18-84 hours, preferably 24-78 hours, preferably 48-75 hours, or about 72 hours. In a preferred embodiment, this reaction results in a resinous solution that can be precipitated with a polar aprotic solvent, preferably acetone, filtered and washed with aprotic solvents such as acetone and ethanol, and then dried under vacuum at 20-100° C., preferably 40-80° C., or about 60° C. In a preferred embodiment, this reaction has a yield of greater than 40%, preferably greater than 50%, preferably greater than 55%, preferably greater than 60%, preferably greater than 65%, preferably greater than 70%, preferably greater than 75%, preferably greater than 80/o %. The product yield is calculated as (mass of product/mass of reactants)×100%.

According to a third aspect, the present disclosure relates to a method for removing a heavy metal from an aqueous solution, comprising (i) contacting the aqueous solution having an initial concentration of the heavy metal with the crosslinked polydithiocarbamate to form a mixture, and (ii) filtering the mixture to obtain a heavy metal loaded crosslinked polydithiocarbamate and an aqueous solution having a reduced concentration of the heavy metal compared to the initial concentration.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the crosslinked polydithiocarbamate of the present disclosure in any of its embodiments with heavy metal contaminated water sources and systems. The methods may be carried out in tanks, containers, or small scale applications in both batch mode and fixed-bed or column mode.

As used herein, a ligand refers to in inorganic chemistry an ion or molecule (functional group) that coordinates a metal atom to form a coordination complex. The binding between metal and ligand generally involves formal donation of one or more of the ligand's electron pairs. The nature of the metal-ligand bonding can range from covalent to ionic and the metal-ligand bond order can range from one to three. Ligands are classified in many ways including, but not limited to, size (bulk), the identity of the coordinating atom(s), and the number of electrons donated to the metal (i.e. denticity or hapticity). Denticity refers to the number of times a ligand bonds to a metal through noncontiguous donor sites. Many ligands are capable of binding metal ions through multiple sites, usually because the ligands have lone pairs on more than one atom. A ligand that binds through one site is classified as monodentate, a ligand that binds through two sites is classified as bidentate, three sites as tridentate, and more than one site as polydentate. Ligands that bind via more than one atom are often termed chelating. Complexes of polydentate ligands are called chelate complexes. As used herein, chelation is a particular type of way ions and molecules bind to metal ions. It involves the formation or presence of two or more coordinate bonds between a polydentate (multiple bonded) ligand and a single central atom. These ligands are often organic compounds and may be referred to as chelants, chelators, chelating agents, or sequestering agents. The chelate effect describes the enhanced affinity of chelating ligands for a metal ion compared to the affinity of a collection of similar non-chelating (i.e. monodentate) ligands for the same metal. In terms of the present disclosure, the crosslinked polydithiocarbamate may adsorb or bind with one or more heavy metal ions by coordinating the metal ion at a site, e.g., a —$CS_2^-$ moiety through monodentate coordination, or polydentate chelation including, but not limited to bidentate chelation or tridentate chelation to the metal ion to form a heavy metal loaded crosslinked polydithiocarbamate.

The performance of an adsorbent material, polymers inclusive, is largely dependent on the type of functionality it carries. The presence of chelating functionalities such as thiocarbamate, thiol, carbonyl, phosphoryl and amine moieties is known to enhance the performance of materials towards the removal of heavy metal ions from aqueous solutions. The moieties have a known ability to form strong complexes with heavy metal ions. In general sulfur compounds exhibit a significant affinity towards heavy metals. For example, sulfur containing moieties such as thiocarbamate, thiol, mercaptobenzothiazole, benzoylthiourea, etc. are known to be effective for Cd(II) removal from aqueous media due to the divalent ion's affinity towards sulfur and its compounds (A. R. Hutchison, D. A. Atwood, Mercury pollution and remediation: the chemist's response to a global crisis, Journal of Chemical Crystallography, 33, 631-645; and E. Pişkin, K. Kesenci, N. Şatiroğlu, Ö. Genç, Dithiocarbamate-incorporated monodisperse polystyrene microspheres as specific sorbents: Adsorption of cadmium ions, J Appl Polym Sci, 59 (1996) 109-117, each incorporated herein by reference in their entirety).

The crosslinked polydithiocarbamate of Formula (I) of the current disclosure has at least one dithiocarbamate group present in the smallest repeating unit. In a preferred embodiment, the crosslinked polydithiocarbamate of the present disclosure of Formula (I) includes multiple ligand center or chelating centers (i.e. —$CS_2^-X^+$, —NH, and the like) to which one or more heavy metal ions can be coordinated.

The metal ions that are coordinated by the plurality of ligands centers (i.e. dithiocarbamate moieties) are preferably heavy metal ions. In a preferred embodiment, a heavy metal has a density of greater than 3.5 g/cm$^3$ and/or an atomic weight of greater than 20. Exemplary metal ions that can be adsorbed by the crosslinked polydithiocarbamate of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof. Further, these metal ions may be of any oxidation state $M^{+1}$, $M^{+2}$, $M^{+3}$, etc. In a preferred embodiment, the heavy metal is an ion of at least one heavy metal selected from the group consisting of Pb, Cd, As, Cu, Ni, Co, Mn, and Cr, most preferably the heavy metal is Cd(II). It is equally envisaged that the crosslinked polydithiocarbamate may be adapted or chemically modified to adsorb, incorporate and/or bind additional metal ions in addition to, or in lieu of Cd(II) and may bind selectively or collectively. In one embodiment, the additional metal ion may be any ion which is suitably coordinated by the crosslinked polydithiocarbamate of Formula (I) in any of its embodiments. Exemplary additional metal ions include, but are not limited to, ions of an alkali metal (Li, Na, K, etc.), an alkaline earth metal (Mg, Ca, Sr, etc.), a lanthanide metal (La, Ce, Eu, Yb, etc.), an actinide metal (Ac, Th, etc.), or a post-transition metal (Al, Sn, Pb, In, etc.). Preferably the additional metal ion is a transition metal ion, most preferably a heavy metal ion.

As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the crosslinked polydithiocarbamate). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In at least one embodiment, the heavy metal ion is removed by physisorption with the crosslinked polydithiomate of the current disclosure, meaning the process is primarily physical and preferably no chemical changes occur on the crosslinked polydithiocarbamate or the metal ion.

In one or more embodiments, the crosslinked polydithiocarbamate of the current disclosure is present in the aqueous solution at a concentration in the range of 0.1-25 grams per liter volume of the aqueous solution during the contacting, preferably 0.2-20.0 g L$^{-1}$, preferably 0.5-10.0 g L$^{-1}$, preferably 1.0-5.0 g L$^{-1}$, or about 1.5 grams per liter volume of the aqueous solution during the contacting.

In one or more embodiments, the method for removing heavy metal is carried out in an aqueous solution with a pH in the range of 2 to 8, preferably a pH in the range of 2 to 7, more preferably a pH in the range of 3 to 7. In a preferred embodiment, the method for removing heavy metal of the current invention is equally effective over the pH ranging from 3 to 7.

In one or more embodiments, the crosslinked polydithiocarbamate of the present invention is effective in adsorbing heavy metal ions in an aqueous solution within a temperature range of 10-100° C., preferably 20-90° C., preferably 25-80° C., preferably 30-70° C. In a preferred embodiment, the crosslinked polydithiocarbamate is contacted with the aqueous solution at a temperature in the range of 15-85° C., preferably 40-58° C., preferably 45-55° C.

In a preferred embodiment, the crosslinked polydithiocarbamate of the present disclosure is contacted with the aqueous solution for 0.1 to 24 hours, preferably 0.25-12 hours, preferably 0.5-10 hours, preferably 1.0-8.0 hours, preferably 1.5-6.0 hours, preferably 2.0-5.0 hours, preferably 2.5-4.0 hours.

In one or more embodiments, the heavy metal adsorption capacity of the crosslinked polydithiocarbamate of the present invention increases as the initial concentration of heavy metal ions in aqueous solution increases. In a preferred embodiment, the crosslinked polydithiocarbamate is effective in removing heavy metal from aqueous samples wherein the initial concentration of the heavy metal ion, preferably Cd(II), in the aqueous solution is in the range of 5-10,000 µg $L^{-1}$, preferably 50-5000 µg $L^{-1}$, preferably 100-4000 µg $L^{-1}$, preferably 500-3000 µg $L^{-1}$, preferably 1000-2000 µg $L^{-1}$.

In one or more embodiments, the crosslinked polydithiocarbamate of the present invention has an adsorption capacity of at least 50 µg of heavy metal per gram of the crosslinked polydithiocarbamate, preferably at least 500 µg $g^{-1}$, preferably at least 1000 µg $g^{-1}$, preferably at least 3000 µg $g^{-1}$, preferably at least 4000 µg $g^{-1}$, preferably at least 4500 µg of heavy metal per gram of the crosslinked polydithiocarbamate. In a preferred embodiment, the crosslinked polydithiocarbamate has an adsorption capacity in the range of 100-5000 µg of heavy metal per gram of the crosslinked polydithiocarbamate, preferably 750-4250 µg $g^{-1}$, preferably 1250-3500 µg $g^{-1}$, preferably 2000-2750 µg of heavy metal per gram of the crosslinked polydithiocarbamate.

In one or more embodiments, greater than 30% of a total mass of the heavy metal is removed from the aqueous solution at the end of the adsorption process following contacting, preferably greater than 40%, preferably greater than 50, preferably greater than 60%, preferably greater than 70%, preferably greater than 80%, preferably greater than 90%, preferably greater than 92%, preferably greater than 94%, preferably greater than 96%, preferably greater than 97%, preferably greater than 98%, preferably greater than 99% of a total mass of the heavy metal is removed from the aqueous solution at the end of the adsorption process following contacting.

In one or more embodiments, the adsorption of Cd(II) by the crosslinked polydithiocarbamate of the present invention in an aqueous solution increases as the number n of carbon atoms in the alkyl chain of the diaminoalkane of Formula (I) decreases. In a preferred embodiment, each $R_1$, $R_2$, and $R_3$ is a hydrogen and n is 2 in the crosslinked polydithiocarbamate of Formula (I) of the present invention and the aqueous solution has Cd(II) and at least one additional heavy metal ion, which is an ion of at least one heavy metal selected from the group consisting of Pb, As, Cu. Ni, Co, Mn, and Cr, and greater than 95% of a total mass of Cd(II) is removed from the aqueous solution, preferably greater than 96%, preferably greater than 97%, preferably greater than 98%, preferably greater than 99%, preferably greater than 99.7% of a total mass of Cd(II) is removed from the aqueous solution.

Adsorption is a key mechanism of removing heavy metals in the present disclosure, which requires contact between the adsorbent material (crosslinked polydithiocarbamate) and the target adsorbate (heavy metal ions). There is generally an increase in the removal efficiency with increasing agitation speed until a certain level. In certain embodiments, the method further comprises agitation of the aqueous solution before, during or after the contacting. The agitation may encompass shaking, stirring, rotating, vibrating, sonication and other means of increasing contact between the crosslinked polydithiocarbamate of the current invention and heavy metal ions. Further, the agitation can be performed manually or mechanically. In one embodiment, the treatment and contacting process may be enhanced by mechanical shaking or agitation, preferably by a bath shaker at a speed of up to 1000 rpm, preferably up to 750 rpm, preferably up to 500 rpm, preferably 50-450 rpm, preferably 75-375 rpm, preferably 100-300 rpm in order to increase contact between the crosslinked polydithiocarbamate and heavy metal ions.

In a preferred embodiment, the method further comprises recovering and reusing the heavy metal loaded crosslinked polydithiocarbamate. In certain embodiments, the heavy metal loaded crosslinked polydithiocarbamate may be obtained from the aqueous solution with methods including, but not limited to, filtration, centrifugation, evaporation, heated evaporation and the like, preferably filtration or centrifugation, most preferably filtration. In certain embodiments, the obtained heavy metal loaded crosslinked polydithiocarbamate may be washed several times with an appropriate solvent to remove all materials present after each round of heavy metal absorption before being regenerated and reused and/or recycled in another round of removal of heavy metal ions from an aqueous solution.

In one or more embodiments, the method further comprises (i) treating the heavy metal loaded crosslinked polydithiocarbamate with an acid to desorb the heavy metal and form a regenerated crosslinked polydithiocarbamate, and (ii) using the regenerated crosslinked polydithiocarbamate to remove a heavy metal from an aqueous solution. In this manner the crosslinked polydithiocarbamate can be regenerated and/or reused in another contacting, adsorbing and removal. In one embodiment, metal ions are desorbed from the crosslinked polydithiocarbamate of Formula (I) by treating or immersing the heavy metal loaded crosslinked polydithiocarbamate in an acidic solution of 0.25-5.0 M in concentration, preferably 0.5-2.5 M, preferably 1.0-2.0 M in concentration for up to 48 hours, preferably up to 36 hours, preferably up to 24 hours, preferably up to 12 hours. Strong acids including, but not limited to, HCl, $H_2SO_4$, and $HNO_3$ are preferred, but organic acids and weak acids (i.e. acetic acid) may also be used in the desorption process, most preferably the acid is $HNO_3$. In one embodiment, treating the heavy metal loaded crosslinked polydithiocarbamate with an acid desorbs at least 40% of the total mass of the heavy metal loaded, preferably at least 50%, preferably at least 60%, preferably at least 70%, preferably at least 75% of the total mass of the heavy metal loaded.

In one embodiment, the metal ion removal or adsorption process by the crosslinked polydithiocarbamate is an endothermic process, as indicated by a positive ΔH value, preferably greater than 4 kJ/mol, preferably greater than 6 kJ/mol, preferably greater than 8 kJ/mol, preferably greater than 12 kJ/mol, preferably greater than 15 kJ/mol, preferably greater than 17 kJ/mol. In one embodiment, the metal ion removal or adsorption process by the crosslinked polydithiocarbamate is a spontaneous process as indicated by a positive ΔS value, preferably 20 to 80 J/K mol, preferably 30 to 70 J/K mol, preferably 40 to 60 J/K mol.

The examples below are intended to further illustrate procedures for preparing and characterizing the crosslinked polydithiocarbamates of the present invention, and assessing the method for heavy metal removal using these crosslinked polydithiocarbamates. They are not intended to limit the scope of the claims.

Example 1

Materials and Methods

Pyrrole (PY), 1,2-Diaminoethane (ED), 1,4-Diaminobutane (BD), 1,8-Diamineoctane (OD), 1,10-Diaminodecane (DD), paraformaldehyde, heptane, carbon disulfide ($CS_2$), potassium hydroxide, acetone, dimethylformamide (DMF) were used as received without purification. Solvents and other chemicals used were of analytical grade. Elemental analysis was done using a Perkin-Elmer Elemental Analyzer series II Model 2400. FT-IR spectra recorded on a Perkin Elmer 16F PC FTIR spectrometer. Solid-state $^{13}$C-NMR spectra were taken using Bruker WB-400 spectrometer with a spinning rate of 10 KHz Thermogravimetric analysis (TGA) was performed using a thermal analyzer (STA 429) by Netzsch (Germany). Powder X-ray Diffraction pattern for crystal nature was recorded using Rigaku Miniflex II Desktop X-ray Diffractometer from Theta=5-50. Concentration of metal ions before and after adsorption where measured by inductively coupled plasma (ICP-MS).

Example 2

Synthesis of Crosslinked Polymeric Resins (Pyrrole Based Cross-Linked Polyamines)

A mixture of pyrrole (0.01 mol), an alkyldiamine (0.01 mol) and paraformaldehyde (0.02 mol) in heptane (20 ml) was stirred at 90° C. for 24 h in a closed round bottom flask (50 ml). The resinous materials were washed with water and acetone several times in order to remove any unreacted material and dried under vacuum at 60° C. until a constant weight is achieved (FIG. 1 and Table 1).

TABLE 1

Synthesis results of crosslinked polymeric resins (pyrrole based cross-linked polyamines).

| Polymer | Yield[b] % | Elemental analysis (%) | | |
|---------|-----------|---|---|---|
|         |           | C | H | N |
| PY-ED | 64 | 58.21 | 8.15 | 24.49 |
| PY-BD | 67 | 60.94 | 9.11 | 20.15 |
| PY-OD | 82 | 69.11 | 10.72 | 16.07 |
| PY-DD | 68 | 76.47 | 12.35 | 15.29 |

[a]Pyrrole: formaldehyde: diamine = 1:2:1.
[b]Yield = mass of products/mass of reactants * 100%.

Example 3

Crosslinked Polydithiocarbamates (Dithiocarbamate Modified Cross-Linked Polymers)

The cross-linked polyamine (0.01 mol), carbon disulfide (0.06 mol) and potassium hydroxide (0.06 mol) in 8 ml of DMF were mixed at room temperature for 72 hours. The orange resinous crosslinked polydithiocarbamates (dithiocarbamate modified cross-linked polymers, DTCP's) were precipitated from the reaction mixture using acetone, and washed with acetone and ethanol several times then dried under vacuum at 60° C. to obtain a solid orange powder. FIG. 1 shows the modification process on the crosslinked polydithiocarbamates.

Example 4

Synthesis and Characterization of Crosslinked Polymeric Resins (Pyrrole Based Cross-Linked Polyamines)

The results of the polymerization reactions are shown in table 1, elemental analysis of the synthesized crosslinked polymeric resins indicates the successful reaction of pyrrole, formaldehyde as a linker and various alkyldiamines. The crosslinked polymeric resins revealed an increase in rubbery like texture as the length of the diamine alkyl chain increased which was considered to be correct as the flexibility of the synthesized crosslinked polymeric resins increased with increasing length of flexible aliphatic chain from 1,2-ethylenediamine toward 1,10-decanediamine. Elemental analysis (Table 1) shows an increase in the carbon content per repeating unit, and a decrease in the nitrogen content as the ratio of methylene (—$CH_2$—) units became larger the aliphatic chain of the alkyldiamine increases.

Figure 2:
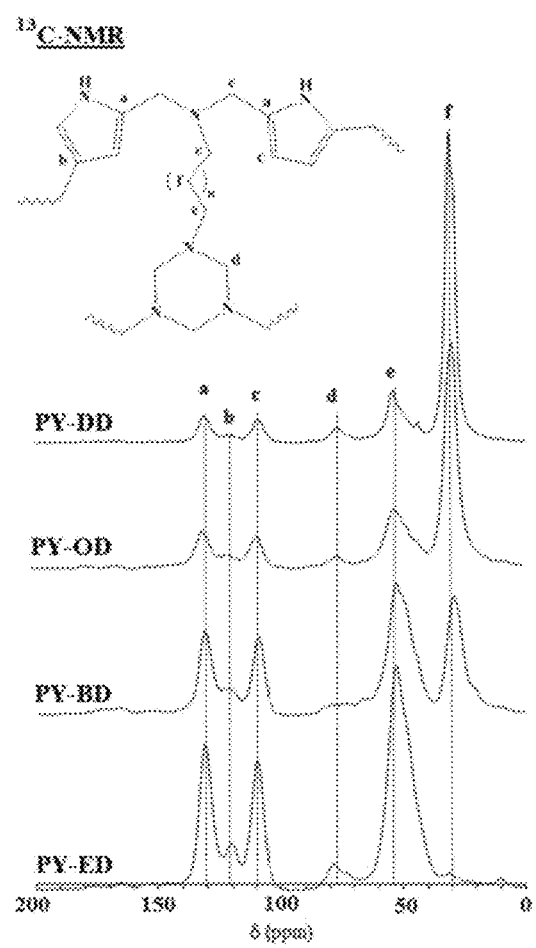
FIG. 2 is an overlay of solid-state $^{13}C$ nuclear magnetic resonance ($^{13}C$ NMR) spectra of a series of crosslinked polymeric resins PY-ED, PY-BD, PY-OD, and PY-DD, which are synthetic precursors to crosslinked polydithiocarbamate of Formula (I) wherein each $R_1$, $R_2$, and $R_3$ is —H, and n=2, 4, 8, or 10, respectively.

Solid-state $^{13}$C-NMR spectra of the synthesized crosslinked polymeric resins are shown in FIG. 2. The assignment of peaks and spectra confirmed the proposed structure shown in the figure, a peak ~80 ppm revealed the formation of a 1,3,5-Triazinane ring in the crosslinked polymeric resins. The peak ~30 ppm is assigned for the aliphatic chain where the intensity increases with the increase of the aliphatic moiety which is originally from the alkanediamine. The aliphatic carbons adjacent to the nitrogen atoms in the chain have been assigned the broad peak ~50 ppm. The peaks from ~110-130 ppm are assigned to the aromatic carbons of the pyrrole moiety.

Figure 3:
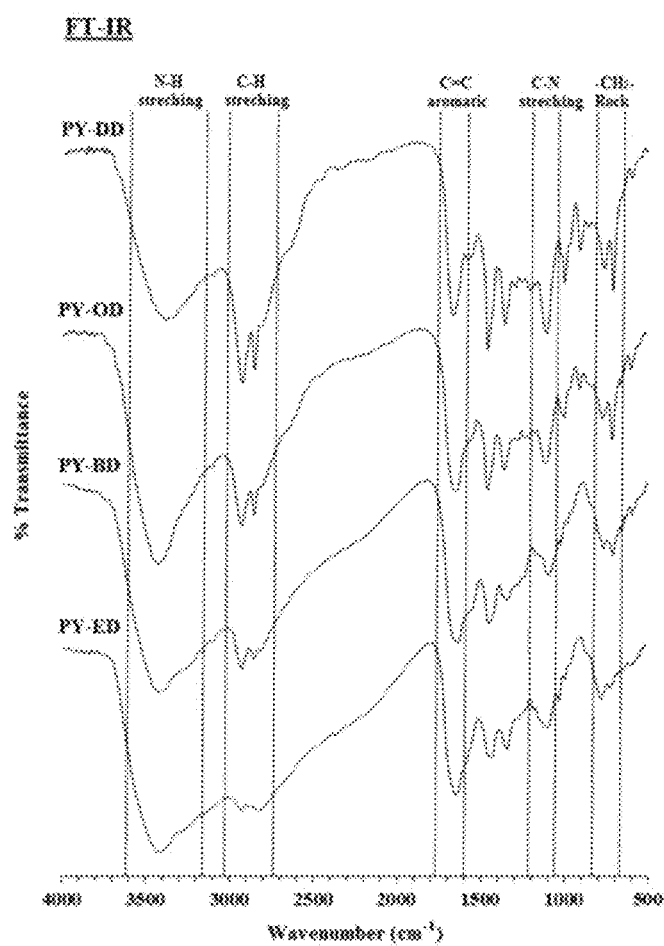
FIG. 3 is an overlay of Fourier transform infrared (FT-IR) spectra of a series of crosslinked polymeric resins PY-ED, PY-BD, PY-OD, and PY-DD, which are synthetic precursors to crosslinked polydithiocarbamate of Formula (I) wherein each $R_1$, $R_2$, and $R_3$ is —H, and n=2, 4, 8, or 10, respectively.

FT-IR spectra of the synthesized crosslinked polymeric resins are shown in FIG. 3. Similar characteristic peaks in the synthesized crosslinked polymeric resins reveal that each component is clearly distinguished. It has been observed that the —$CH_2$— rock peaks around ~720 cm$^{-1}$ are diminishing as the chain becomes shorter and shorter.

Figure 4A:
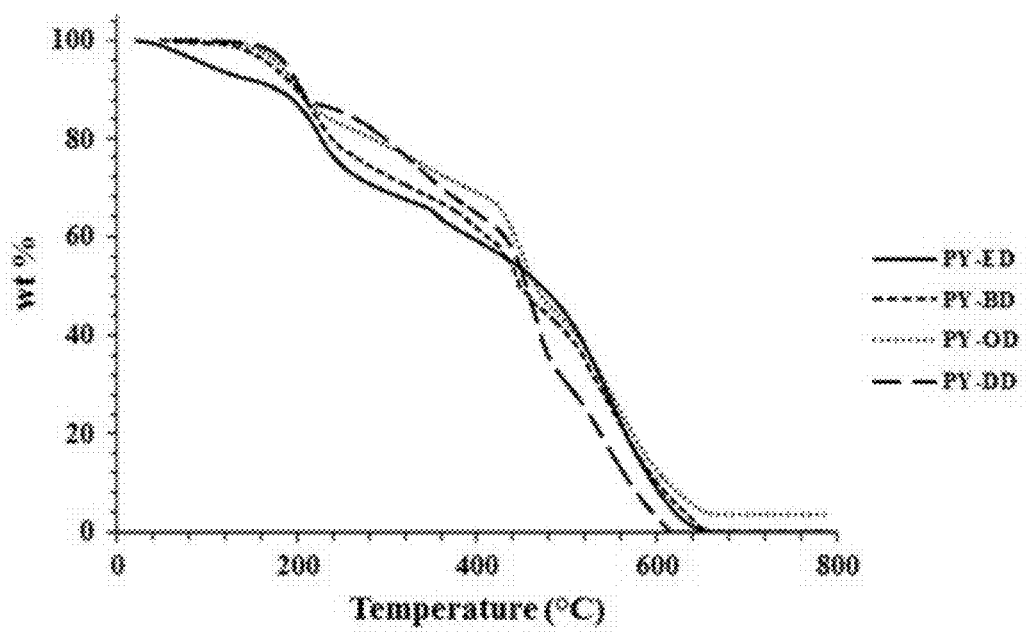
FIG. 4A is an overlay of thermogravimetric analysis (TGA) of a series of polymeric resins PY-ED, PY-BD, PY-OD, and PY-DD, which are synthetic precursors to crosslinked polydithiocarbamate of Formula (I) wherein each $R_1$, $R_2$, and $R_3$ is —H, and n=2, 4, 8, or 10, respectively.
Figure 4B:
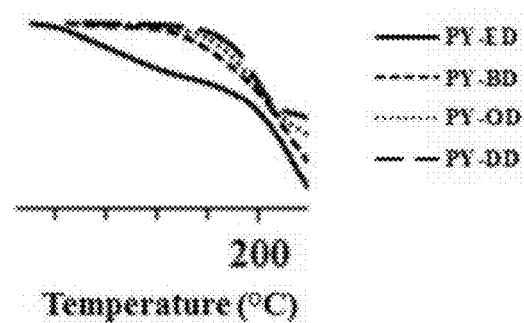
FIG. 4B is an expanded view of the TGA graph in FIG. 4A showing that the thermal degradation of polymeric resins PY-ED, PY-BD, PY-OD, and PY-DD starts at around 190° C.

Thermogravimetric analysis (TGA) was performed to analyze the thermal properties of the synthesized crosslinked polymeric resins. TGA of the synthesized crosslinked polymeric resins shown in FIG. 4A indicates a trend in the thermal stability between the four crosslinked polymeric resins. As the length of the aliphatic chain increases the thermal stability increases, which could be attributed to better packing of the crosslinked polymeric resins. The thermal degradation of the crosslinked polymeric resins starts around 190° C. as shown in FIG. 4B.

Example 5

Characterization of the Crosslinked Polydithiocarbamates (Dithiocarbamate Modified Cross-Linked Polymers)

Figure 5:
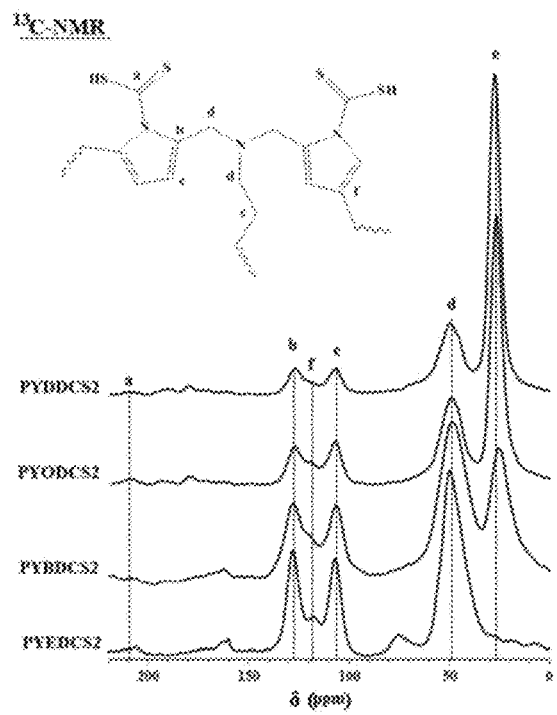
FIG. 5 is an overlay of solid-state $^{13}C$ nuclear magnetic resonance ($^{13}C$ NMR) spectra of crosslinked polydithiocarbamate of Formula (I) wherein each $R_1$, $R_2$, and $R_3$ is —H, and n is 2 (PYEDCS2), 4 (PYBDCS2), 8 (PYODCS2), or 10 (PYDDCS2).
Figure 6:
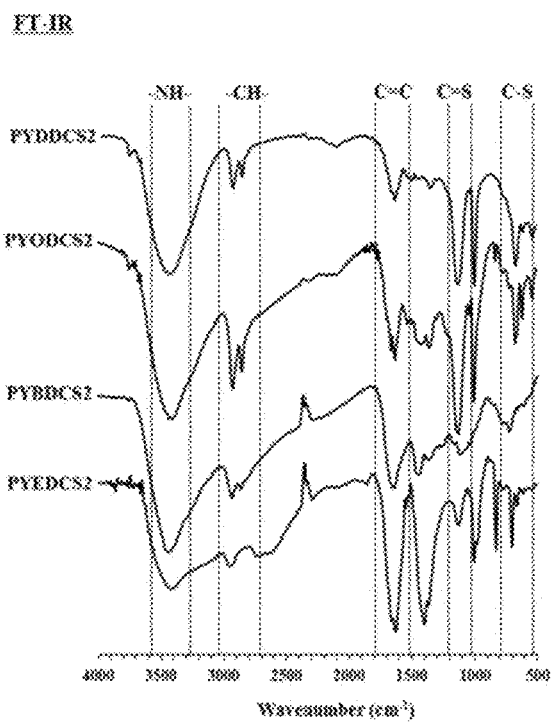
FIG. 6 is an overlay of Fourier transform infrared (FT-IR) spectra of crosslinked polydithiocarbamate of Formula (I) wherein each $R_1$, $R_2$, and $R_3$ is —H, and n is 2 (PYEDCS2), 4 (PYBDCS2), 8 (PYODCS2), or 10 (PYDDCS2).

FT-IR and $^{13}$C-NMR spectra of the modified polymers are shown in FIGS. 5 and 6. The FT-IR spectra show the presence of new bands at ~1000 cm$^{-1}$ and ~600 cm$^{-1}$, which are assigned to the symmetric and asymmetric C—S stretching vibrations of the dithiocarbamate moiety, respectively. The band at ~1450 cm$^{-1}$ is assigned to the N—CS bond stretching vibrations (I. P. Ferreira, G. M. de Lima, E. B. Paniago, C. B. Pinheiro, J. L. Wardell, S. M. S. V. Wardell, Study of metal dithiocarbamate complexes, Part V. Metal complexes of [$S_2CN(CH_2CH(OMe)_2$]: A standard dimeric zinc dithiocarbamate structural motive, a rare cadmium dithiocarbamate coordination polymer, and a hydrated sodium dithiocarbarmate complex, with a[$Na_2O_2$] core and chain, Inorganica Chimica Acta, 441 (2016) 137-145, incorporated herein by reference in its entirety).

$^{13}$C-NMR spectra of the modified polymers show the appearance of the —C(=S)S peak around 208 ppm while the rest of the spectra shows a similar behavior as the original crosslinked polymeric resin series (X. Cheng, R. Cheng, S. Ou, Y. Li, Synthesis and adsorption performance of dithiocarbamate-modified glycidyl methacrylate starch, Carbohydrate Polymers, 96 (2013) 320-325, incorporated herein by reference in its entirety).

Example 6

Powder X-Ray of the Crosslinked Polydithiocarbamates (Dithiocarbamate Modified Cross-Linked Polymers)

Evaluation of the crystallinity of the crosslinked polymers and their modification was performed using Powder X-ray diffraction (PXRD) spectroscopy. Prior to modification the crosslinked polymeric resin series are amorphous in nature as can be seen in FIG. 7A.

Figure 8:
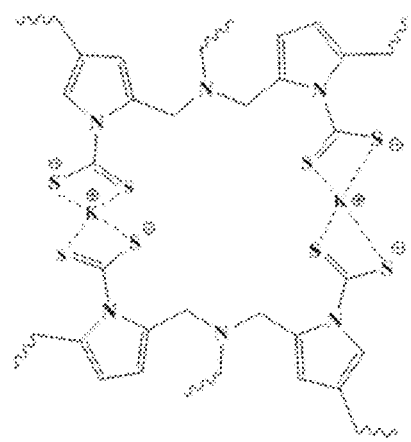
FIG. 8 is a proposed schematic representation for interchain chelation of $K^+$ ions between dithiocarbamate moieties in a crosslinked polydithiocarbamate.

Remarkably, a semi-crystalline pattern has been observed in the PXRD patterns (FIG. 7B) for the crosslinked polydithiocarbamates where several well-defined peaks can be seen. The crystallinity behavior of a polymer can be observed under X-Ray if their chains are closely packed in an ordered fashion. This behavior can be explained by the high chelating capability of the crosslinked polydithiocarbamates (FIG. 8). Chelation of potassium cations in-between dithiocarabamate moieties of the polymer chains could result in chain stacking by inter-chain chelation (L. Liu, J. Wu, X. Li, Y. Ling. Synthesis of poly(dimethyldiallylammonium chloride-co-acrylamide)-graft-triethylenetetramine-dithiocarbamate and its removal performance and mechanism of action towards heavy metal ions, Separation and Purification Technology, 103 (2013) 92-100, incorporated herein by reference in its entirety). Furthermore, it has been observed that longer chain leads to higher complexity of the PXRD pattern, which would indicate the easiness for the longer chain to undergo inter-chain chelation and display a higher degree of crystallinity (B. Endrödi, J. Mellár, Z. Gingl, C. Visy, C. Janáky, Molecular and Supramolecular Parameters Dictating the Thermoelectric Performance of Conducting Polymers: A Case Study Using Poly(3-alkylthiophene)s, The Journal of Physical Chemistry C, 119 (2015) 8472-8479, incorporated herein by reference in its entirety).

Example 7

Adsorption Experiments

An adsorption set of experiments was conducted using the technique of batch equilibrium in polyethylene vials (50 ml capacity). A mixture of 30 mg of crosslinked polydithiocarbamates immersed in an aqueous solution (20 ml) of $Cd^{2+}$ ions with concentration of 1 to 5 mg $L^{-1}$ to test the effect of the chain length. Once the first adsorption experiment was completed, the best crosslinked polydithiocarbamate of the series was chosen for further adsorption studies at different concentrations (1-5 mg/L), times (0-3 h), temperatures (25, 35 and 50° C.) and pH's (3, 4, 5, 6 and 7). The pH of the solutions was adjusted by preparing acetate buffers. The crosslinked polydithiocarbamates were filtered and the concentration of the metal ions in the filtrate was analyzed. The adsorption capacity of the crosslinked polydithiocarbamate was calculated using Eq. (1):

$$q_{Cd^{2+}} = \frac{(C_o - C_e)V}{W} \quad (1)$$

where $C_o$ is the initial metal ion concentration (mg $L^{-1}$), $C_e$ is the metal ion concentration at equilibrium (mg $L^{-1}$), V is the volume of solution (L), W is the weight of the crosslinked polydithiocarbamate (g), and $q_{Cd^{2+}}$ is the adsorption capacity at equilibrium (mg $g^{-1}$) (J. Liu, Y. Ma. T. Xu, G. Shao, Preparation of zwitterionic hybrid polymer and its application for the removal of heavy metal ions from water, Journal of Hazardous Materials, 178 (2010) 1021-1029; and R. Coşkun, C. Soykan, M. Saçak, Removal of some heavy metal ions from aqueous solution by adsorption using poly (ethylene terephthalate)-g-itaconic acid/acrylamide fiber, Reactive and Functional Polymers, 66 (2006) 599-608, each incorporated herein by reference in their entirety).

Example 8

Quality Control and Quality Assurance

Quality control (QC) was maintained beginning with the design of the experimental work, sampling and continue through the final validation of the obtained results. QC for cadmium ion determinations included repeated injections and periodic analysis of the standard solution. The loss of cadmium and contamination of the aliquots was limited to a minimum as per the requirements of quality control and assurance of results. The relative standard deviation of the results was ≤5%.

Example 9

Adsorption Properties

The crosslinked polydithiocarbamate series displays an excellent attraction towards the removal of $Cd^{2+}$ ions from aqueous solutions and wastewater samples. The attraction can be explained by sulfur affinity to heavy metals. In the case of the dithiocarbamate functionality, the presence of two-sulfur atoms group would facilitate the chelation of $Cd^{2+}$ ions.

Example 10

Effect of Polymeric Chain

Figure 9:
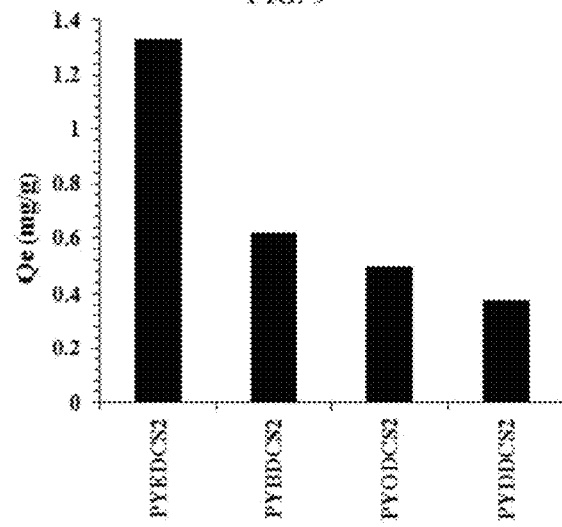
FIG. 9 is a bar graph chart illustrating the effect of alkyl chain length on the Cd(II) adsorption capacity of a crosslinked polydithiocarbamate of Formula (I) wherein each $R_1$, $R_2$, and $R_3$ is —H, and n is 2 (PYEDCS2), 4 (PYBDCS2), 8 (PYODCS2), or 10 (PYDDCS2).

The effect of polymer chain is predicted to be primarily on the ratio of dithiocarbamate functionality to the hydrophobic nature of the methylene chain in the crosslinked polydithiocarbamates series. The shorter the chain length, the larger the ratio of dithiocarbamate functionality would be, which results in higher adsorption performance. This assumption was evaluated by performing $Cd^{2+}$ adsorption experiment in which ~0.03 g of each crosslinked polydithiocarbamate was stirred in a 20 ml of $Cd^{2+}$ solution (2 mg $L^{-1}$) for 6 hours at room temperature. FIG. 9 illustrates that the best adsorbent in the removal of $Cd^{2+}$ ions along the crosslinked polydithiocarbamate series is PYEDCS2. Therefore, PYEDCS2 was chosen for further adsorption analysis.

Example 11

Effect of pH

Figure 10:
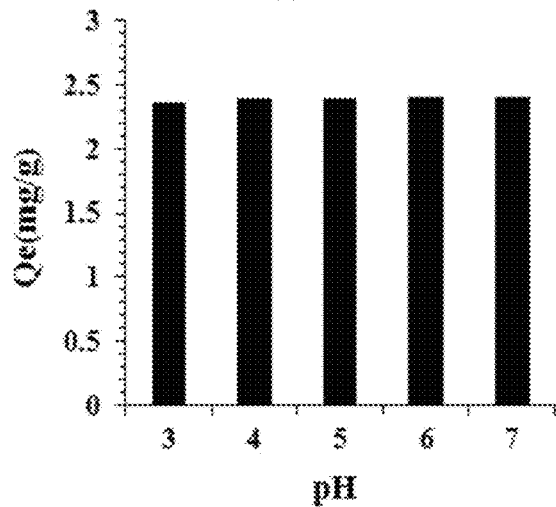
FIG. 10 is a bar graph chart illustrating the effect of pH of an aqueous solution on the Cd(II) adsorption capability of a crosslinked polydithiocarbamate of Formula (I) wherein each $R_1$, $R_2$, and $R_3$ is —H, and n is 2.

The effect of pH is illustrated in FIG. 10. The figure shows that there is a slight increase in the adsorption capacity of PYEDCS2 as the pH increases, which could be attributed to a higher concentration of available dithiocarbamate functionalities. Additionally, if protonated under lower pH, the dithiocarbamate functionality with two sulfur atoms containing two lone pairs of electrons can still chelate effectively to cadmium ions in the aqueous solution, similar results were obtained with our previous studies on the adsorption mercury ions (O. S. Akintola, T. A. Saleh, M. M. Khaled, O. C. S. Al Hamouz, Removal of mercury (II) via a novel series of cross-linked polydithiocarbamates, Journal of the Taiwan Institute of Chemical Engineers, 60 (2016) 602-616, incorporated herein by reference in its entirety).

Example 12

Adsorption Isotherms

Figure 11A:
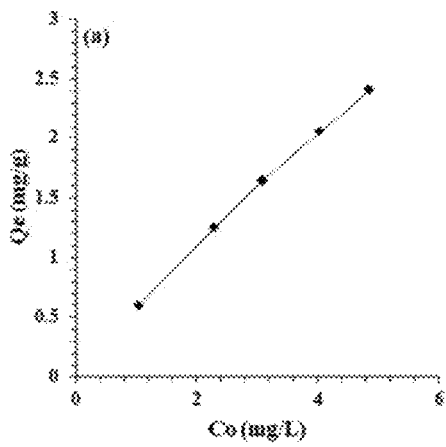
FIG. 11A is a plot illustrating the relationship between initial concentration of Cd(II) and the Cd(II) adsorption capacity of a crosslinked polydithiocarbamate of Formula (I) wherein each $R_1$, $R_2$, and $R_3$ is —H, and n is 2.

The effect of initial concentration was analyzed using $Cd^{2+}$ ions solutions with various initial concentrations (Co) ranging from 1 to 5 mg $L^{-1}$. The effect of initial concentration on the adsorption capacities of the crosslinked polydithiocarbamate is shown in FIG. 11A. The outcomes of the test indicate that an increase in the adsorption capacity has been observed as the initial concentration of the $Cd^{2+}$ increases. Langmuir and Freundlich isotherms were applied in order to evaluate and demonstrate the adsorption mechanism.

Figure 11B:
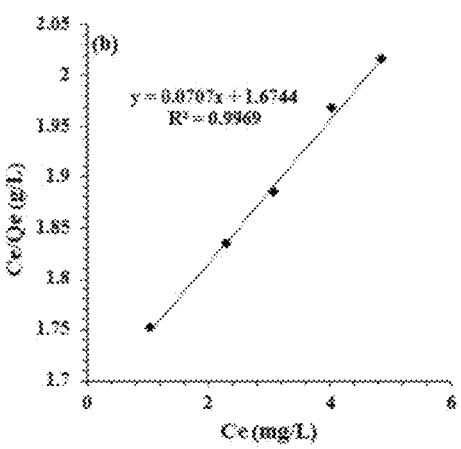
FIG. 11B is a Langmuir isotherm model fitting on the adsorption of Cd(II) by a crosslinked polydithiocarbamate of Formula (I) wherein each $R_1$, $R_2$, and $R_3$ is —H, and n is 2.

The Langmuir adsorption isotherm model is exploited to illustrate the homogenousity of the adsorption process of metal ions on a surface of an adsorbent. One postulate of the Langmuir isotherm is that each metal ion is adsorbed onto only one active site at the adsorbent. Langmuir isotherm can be expressed linearly by the following equation:

$$\frac{Ce}{qe} = \frac{Ce}{Qm} + \frac{1}{bQm} \quad (2)$$

where Ce is concentration (mg $L^{-1}$), qe is the adsorption capacity at equilibrium (mg $g^{-1}$), b expresses Langmuir constant ($L^3$ $mg^{-1}$), and Qm represents the maximum adsorption capacity (mg $g^{-1}$). Therefore, plotting Ce/qe vs Ce yields a linear plot which its slop and intercept can be utilized to find Qm and b, respectively. The linear form of Langmuir isotherm can be found in FIG. 11B. Based on the assumption of Langmuir isotherm, a good linear regression ($R^2$) value indicates a mechanism that the adsorption is homogenous on all active sites of a polymer adsorbent, and the adsorption on all active sites can be considered to have uniform energy (S. Kundu, A. K. Gupta, Arsenic adsorption onto iron oxide-coated cement (IOCC): Regression analysis of equilibrium data with several isotherm models and their optimization, Chemical Engineering Journal, 122 (2006) 93-106; and K. Vijayaraghavan, T. V. N. Padmesh, K. Palanivelu, M. Velan, Biosorption of nickel(II) ions onto *Sargassum wightii*: Application of two-parameter and three-parameter isotherm models, Journal of Hazardous Materials, 133 (2006) 304-308, each incorporated herein by reference in their entirety). From the plot in FIG. 11B, it has been demonstrated that the adsorption process fits the Langmuir isotherm indicating a homogenous adsorption mechanism on the surface of the crosslinked polydithiocarbamate.

Figure 11C:
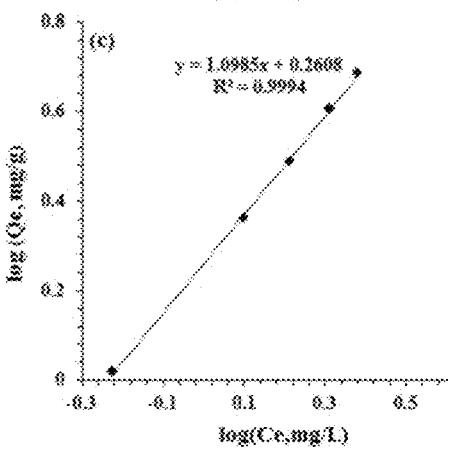
FIG. 11C is a Freundlich isotherm model fitting on the adsorption of Cd(II) by a crosslinked polydithiocarbamate of Formula (I) wherein each $R_1$, $R_2$, and $R_3$ is —H, and n is 2.

On the other hand, Freundlich isotherm expresses the adsorption on heterogeneous surfaces. The linearized form for this model can be expressed as shown in equation 3 (S. Mahdavi, M. Jalali, A. Afkhami, Heavy metals removal from aqueous solutions using $TiO_2$, MgO, and $Al_2O_3$ nanoparticles, Chemical Engineering Communications, 200 (2013) 448-470; and A. F. Shaaban, D. A. Fadel, A. A. Mahmoud, M. A. Elkomy, S. M. Elbahy, Synthesis of a new chelating resin bearing amidoxime group for adsorption of Cu(II), Ni(II) and Pb(II) by batch and fixed-bed column methods, Journal of Environmental Chemical Engineering, 2 (2014) 632-641, each incorporated herein by reference in their entirety):

$$\log q_e = \log k_F + \frac{1}{n}\log Ce \quad (3)$$

where n and $k_f$ are freundlich constants which can be obtained from the slope and the intercept respectively from the plot of the linear form of the model of log qe vs log Ce as shown in FIG. 11C. The values of these constants are found in Table 2. From the figure and table provided, the experimental data fitting both isotherms indicates that the adsorption process may proceed through a homogeneous or heterogeneous adsorption. A comparison table has been added to give a good overview of the polymers adsorption efficiencies (Table 3).

TABLE 2

Langmuir, Freundlich isotherm model constants for the adsorption of $Cd^{2+}$ ions by PYEDCS2.

| Langmuir isotherm model | | |
|---|---|---|
| $Q_m$ (mg/g) | b ($L^3$ $mg^{-1}$) | $R^2$ |
| 14.18 | 0.0420 | 0.9967 |

| Freundlich isotherm model | | |
|---|---|---|
| $k_f$ | 1/n | $R^2$ |
| 1.823 | 1.099 | 0.9994 |

TABLE 3

Comparison between PYEDCS2 and reported adsorbents materials for the adsorption of cadmium ions.

| Material | $Q_m$ (mg $g^{-1}$) | Reference |
|---|---|---|
| Na-Montmorillonite | 5.2 | (a) |
| biosorption by *M. tenuissima* | 0.71 | (b) |
| Magnetic GO (simultaneous adsorption) | 5.34 | (c) |
| Red mud | 10.6 | (d) |
| Activated carbon | 8.0 | (e) |
| PYEDCS2 | 14.18 | This work |

(a) O. Abollino, M. Aceto, M. Malandrino, C. Sarzanini, E. Mentasti, Adsorption of heavy metals on Na-montmorillonite. Effect of pH and organic substances, Water Research, 37 (2003) 1619-1627;
(b) M. A. Fawzy, Phycoremediation and adsorption isotherms of cadmium and copper ions by Merismopedia tenuissima and their effect on growth and metabolism, Environmental Toxicology and Pharmacology, 46 (2016) 116-121;
(c) R. Zare-Dorabei, S. M. Ferdowsi, A. Barzin, A. Tadjarodi, Highly efficient simultaneous ultrasonic-assisted adsorption of Pb(II), Cd(II), Ni(II) and Cu (II) ions from aqueous solutions by graphene oxide modified with 2,2'-dipyridylamine: Central composite design optimization, Ultrasonics Sonochemistry, 32 (2016) 265-276;
(d) R. C. Sahu, R. Patel, B. C. Ray, Adsorption of Zn(II) on activated red mud: Neutralized by CO2, Desalination, 266 (2011) 93-97; and
(e) R. Leyva-Ramos, J. R. Rangel-Mendez, J. Mendoza-Barron, L. Fuentes-Rubio, R. M. Guerrero-Coronado, Adsorption of cadmium(II) from aqueous solution onto activated carbon, Water Science and Technology, 35 (1997) 205-211, each incorporated herein by reference in their entirety.

Example 13

Adsorption Kinetics

Figure 12A:
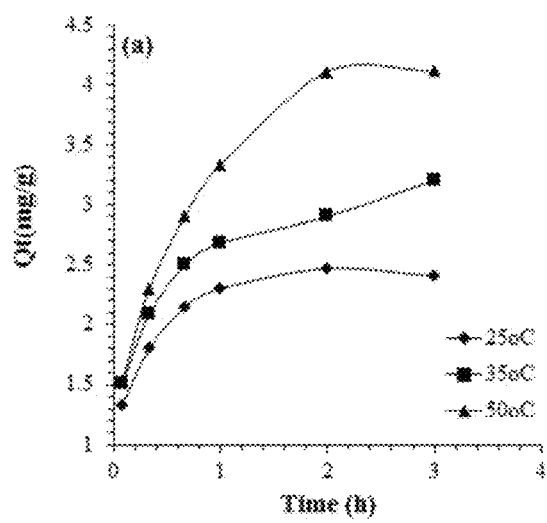
FIG. 12A is a plot illustrating the relationship between contact time and the Cd(II) adsorption capability of a crosslinked polydithiocarbamate of Formula (I) wherein each $R_1$, $R_2$, and $R_3$ is —H, and n is 2.

Effects of temperature and contact time on the capacity of adsorption of the crosslinked polydithiocarbamate was only analyzed on PYEDCS2 as it was determined to have the best performance in the adsorption of $Cd^{2+}$ ions. FIG. 12A illustrates a direct relation between adsorption capacity and contact time. It is noteworthy that the adsorption process reaches to equilibrium within 1 hour. The efficient adsorption toward $Cd^{2+}$ ions by PYEDCS2 can be explained by a high electrostatic affinity between the crosslinked polydithiocarbamate and the metal ion. Furthermore, it is observed that as the temperature increases, the adsorption capacity increases in addition to a slight delay in the equilibrium time. In order to find an explanation for the adsorption mechanism, Ho second-order kinetic model was conducted on the experimental data (O. C. S. Al Hamouz, Synthesis and Characterization of a Novel Series of Cross-Linked (Phenol, Formaldehyde, Alkyldiamine) Terpolymers for the Removal of Toxic Metal Ions from Wastewater, Arab J Sci Eng, 41 (2016) 119-133, incorporated herein by reference in its entirety).

Figure 12B:
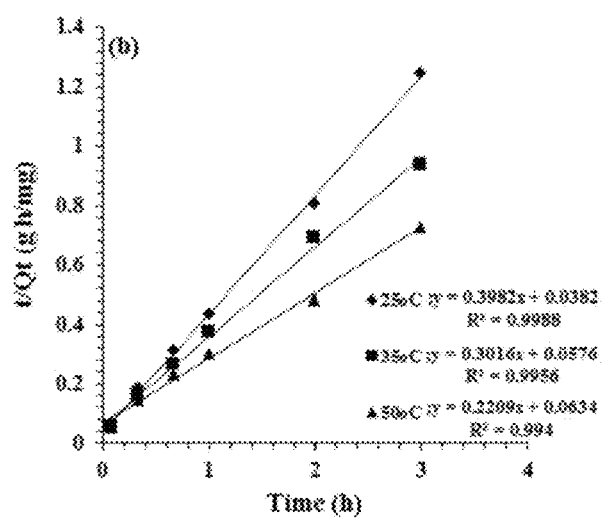
FIG. 12B is a Ho second-order kinetic model fitting for the adsorption of Cd(II) ions by a crosslinked polydithiocarbamate of Formula (I) wherein each $R_1$, $R_2$, and $R_3$ is —H, and n is 2.
Figure 13A:
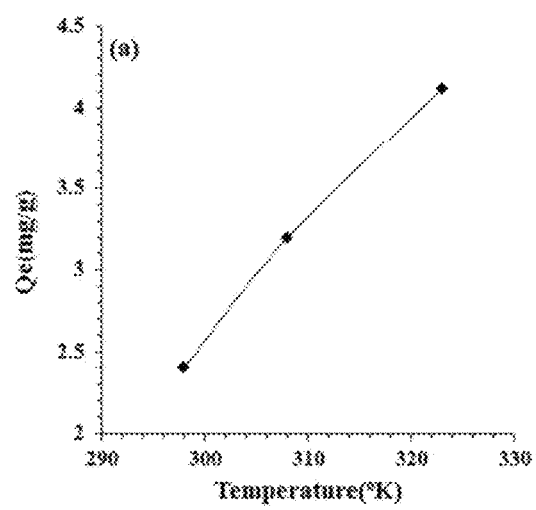
FIG. 13A is a plot illustrating the effect of temperature on the adsorption capacity of a crosslinked polydithiocarbamate of Formula (I) wherein each $R_1$, $R_2$, and $R_3$ is —H, and n is 2.
Figure 13B:
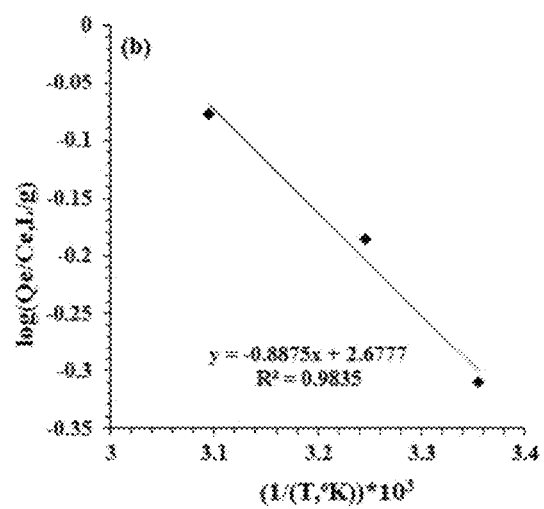
FIG. 13B is a van't-Hoff plot for the adsorption of Cd(II) ions by a crosslinked polydithiocarbamate of Formula (I) wherein each $R_1$, $R_2$, and $R_3$ is —H, and n is 2.
Figure 14A:
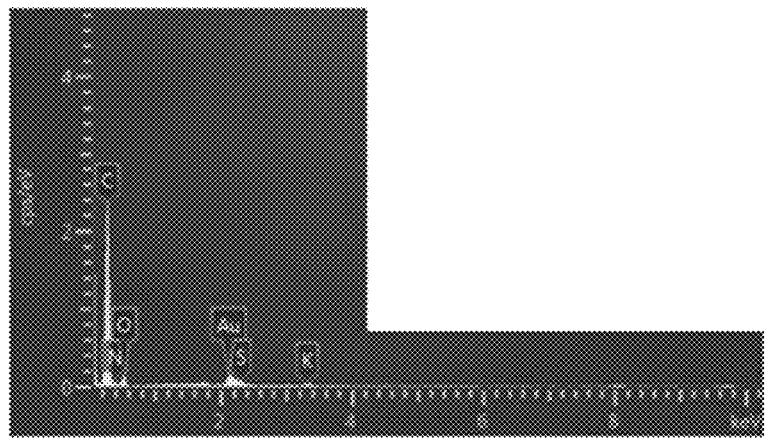
FIG. 14A is a scanning electron microscopy-energy dispersive X-ray spectroscopy (SEM-EDX) elemental analysis of a crosslinked polydithiocarbamate of Formula (I) wherein each $R_1$, $R_2$, and $R_3$ is —H, and n is 2.
Figure 14B:
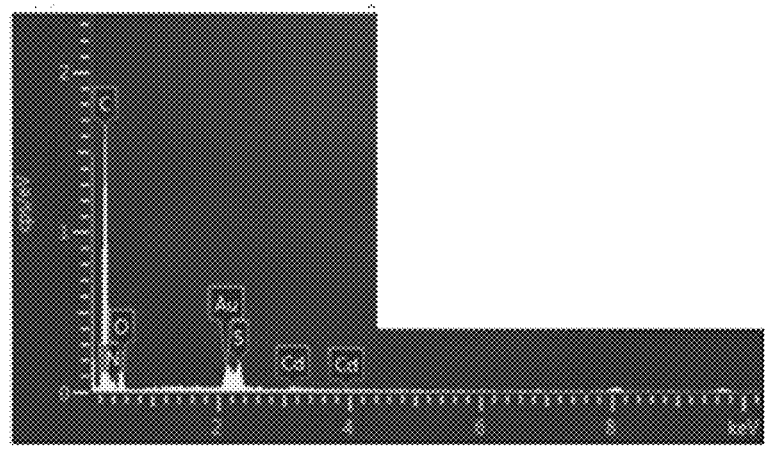
FIG. 14B is a SEM-EDX elemental analysis of a crosslinked polydithiocarbamate of Formula (I) wherein each $R_1$, $R_2$, and $R_3$ is —H and n is 2 after its adsorption of Cd(II).
Figure 15A:
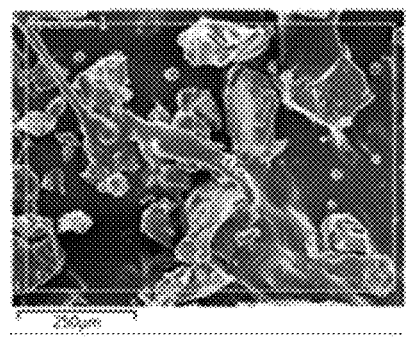
FIG. 15A is a SEM-EDX micrograph image of a crosslinked polydithiocarbamate of Formula (I) wherein each $R_1$, $R_2$, and $R_3$ is —H, and n is 2.
Figure 15B:
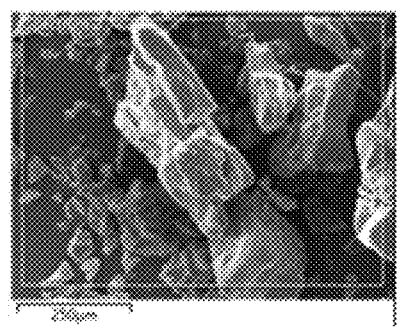
FIG. 15B is SEM-EDX micrograph image of a crosslinked polydithiocarbamate of Formula (I) wherein each $R_1$, $R_2$, and $R_3$ is —H and n is 2 after its adsorption of Cd(II).

Ho second-order kinetic model is used to analyze the kinetics of chemical adsorption from liquid to solid adsorbent (F.-C. Wu, R.-L. Tseng, R.-S. Juang, Initial behavior of intraparticle diffusion model used in the description of adsorption kinetics, Chemical Engineering Journal, 153 (2009) 1-8, incorporated herein by reference in its entirety). The linear form of Ho second-order can be expressed in the following equation:

$$\frac{t}{q_t} = \frac{1}{k_2 q_e^2} + \frac{1}{q_e} t \quad (4)$$

where $q_e$ and $q_t$ (mg g$^{-1}$) are the adsorption capacities at equilibrium and at time t (h), respectively, $k_2$ (g mg$^{-1}$ h$^{-1}$) is the rate constant for the Ho second-order adsorption process, and $k_2 q_e^2$ (mg g$^{-1}$ h$^{-1}$) or h is the initial adsorption rate (FIG. 12B). As demonstrated in Table 4, the experimental data with high regression values fits Lagergren second-order kinetic model which assumes chemical adsorption. The increase in temperature leads to an increase in the adsorption capacity which may be resulted from a higher accessibility of Cd$^{2+}$ ions toward the adsorption sites in PYEDCS2.

TABLE 4

Ho second-order kinetic model fitting parameters for the adsorption of Cd$^{2+}$ ions$^a$ by PYEDCS2

| Metal ion | Temp (K) | $q_{e,exp}$ (mg g$^{-1}$) | Ho second-order kinetic model | | | |
|---|---|---|---|---|---|---|
| | | | $k_2$ (h$^{-1}$ g mg$^{-1}$) | h$^b$ (h$^{-1}$ g$^{-1}$ mg) | $q_{e,cal}$ (mg g$^{-1}$) | R$^2$ |
| Cd$^{2+}$ | 298 | 2.407 | 4.152 | 26.179 | 2.511 | 0.9988 |
| | 308 | 3.250 | 1.579 | 17.362 | 3.316 | 0.9956 |
| | 323 | 4.102 | 0.770 | 15.780 | 4.527 | 0.9940 |

$^a$Initial metal ion concentration 5 mg/L.
$^b$Initial adsorption rate h = $k_2 q_e^2$.

Example 14

Thermodynamics Studies $\Delta G$, $\Delta H$ and $\Delta S$ of the adsorption process can be obtained by solving van't-Hoff equation in its linear form as follows:

$$\log\left(\frac{q_e}{C_e}\right) = -\frac{\Delta H}{2.303\,RT} + \frac{\Delta S}{2.303\,R} \quad (5)$$

As seen in the equation, $\Delta S$ and $\Delta H$ can be obtained from the intercept and slope of the graph obtained by plotting log $(q_e/C_e)$ vs 1/T. The obtained $\Delta H$ has a positive value which indicates that the adsorption process of Cd$^{2+}$ ions on PYEDCS2 is endothermic in nature, as shown in Table 5. In addition, $\Delta S$ has a positive value which can be explained by the release of water molecules due to the breaking of hydration bonding (E. I. Unuabonah, K. O. Adebowale, B. I. Olu-Owolabi, Kinetic and thermodynamic studies of the adsorption of lead (II) ions onto phosphate-modified kaolinite clay, Journal of Hazardous Materials, 144 (2007) 386-395, incorporated herein by reference in its entirety). The interaction becomes spontaneous at higher temperatures as a decrease in the $\Delta G$ value has been observed when the temperature increases.

TABLE 5

Thermodynamic data and activation energy for Cd$^{2+}$ ions adsorption on PYEDCS2

| Metal ion | Temperature (K) | $\Delta G$ (kJ/mol) | $\Delta H$ (kJ/mol) | $\Delta S$ (J/mol K) | R$^2$ |
|---|---|---|---|---|---|
| Cd$^{2+}$ | 298 | 1.715 | 16.99 | 51.27 | 0.9835 |
| | 308 | 1.458 | | | |
| | 323 | 0.433 | | | |

Example 15

SEM-EDX Analysis

SEM-EDX analysis of PYEDCS2 before and after adsorption was investigated. The samples were sputter coated with a thin film of gold and then analyzed. FIGS. 14A, 15A and FIGS. 14B and 15B show EDX analysis of PYEDCS2 before and after adsorption, which provide proof that the crosslinked polydithiocarbamates adsorbed cadmium ions, and the adsorption process occurred on the surface throughout the crosslinked polydithiocarbamate sample. Also, it is revealed that cadmium ions displaced the potassium ions on the dithiocarbamate functionality.

Example 16

Desorption Study

In order to evaluate the reuse of the synthesized adsorbent; a 30 mg of PYEDCS2 was immersed under stirring in a 20 ml of 5 mg/L solution of cadmium ions for 5 hours, filtered and dried. The cadmium ion loaded crosslinked polydithiocarbamate was then immersed in a 1 M solution of nitric acid for 24 hrs. The desorption efficiency was calculated by the ratio of the amount of desorbed cadmium metal ions over the amount of originally adsorbed cadmium ions. The results revealed 74% desorption efficiency.

Example 17

Wastewater Treatment

In order to evaluate the efficacy of the crosslinked polydithiocarbamate, PYEDCS2 was tested on a real wastewater sample spiked with 4 mg/L cadmium ions. The results revealing the efficiency of the crosslinked polydithiocarbamate in the removal of toxic metal ions in real wastewater conditions are shown in Table 6. PYEDCS2 efficiently removed ~99.7% of the spiked cadmium ions in the wastewater sample. These results prove that PYEDCS2 could be utilized as an industrial adsorbent for wastewater treatment.

TABLE 6

Analysis of industrial wastewater collected for Dammam industrial city (Saudi Arabia); spiked, non-spiked and treated by PYEDCS2

| Metal ion | Analysis before treatment (ug/L) | Analysis After treatment (ug/L) | Industrial wastewater spiked with 4000 ug/L (ug/L) | Treated industrial wastewater spiked with 4000 ug/L (ug/L) |
|---|---|---|---|---|
| Pb | 140.9 ± 0.438 | 4.375 ± 0.438 | 140.9 ± 0.438 | 1.356 ± 0.438 |
| Cd | 0.238 ± 0.213 | 0.102 ± 0.213 | 3707 ± 0.213 | 12.04 ± 0.213 |
| As | 24.6 ± 7.077 | 18.52 ± 7.077 | 24.6 ± 7.077 | 19.48 ± 7.077 |
| Zn | <MDL | <MDL | <MDL | <MDL |
| Cu | 24.21 ± 9.235 | 3.314 ± 9.235 | 24.21 ± 9.235 | 2.906 ± 9.235 |
| Ni | 25.06 ± 4.275 | 19.06 ± 4.275 | 25.10 ± 4.275 | 18.41 ± 4.275 |
| Co | 1.591 ± 0.405 | 1.017 ± 0.405 | 1.596 ± 0.405 | 1.118 ± 0.405 |
| Mn | 9.677 ± 1.215 | 3.124 ± 1.215 | 9.558 ± 1.215 | 4.672 ± 1.215 |
| Cr | 37.66 ± 3.594 | 24.39 ± 3.594 | 36.07 ± 3.594 | 20.4 ± 3.594 |

Mean and standard deviation of three replicates (n = 3). ±Values are the method detection limit (MDL), 3σ of the blank sample.

The invention claimed is:

1. A crosslinked polydithiocarbamate of Formula (I)

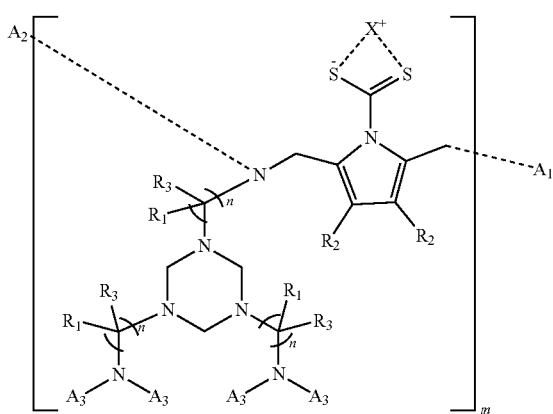

(I)

or a salt thereof, a solvate thereof, a tautomer thereof, a stereoisomer thereof, or a mixture thereof;
wherein, $R_1$ is selected from the group consisting of a hydrogen, an optionally substituted alkyl, an optionally substituted cycloalkyl, an optionally substituted aryl, and an optionally substituted arylalkyl;
each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen;
$R_3$ is selected from the group consisting of a hydrogen, an optionally substituted alkyl, an optionally substituted cycloalkyl, an optionally substituted aryl, and an optionally substituted arylalkyl;
X is an alkali metal cation;
n is a positive integer in the range of 2-16;
m is a positive integer in the range of 2-10000;
$A_1$ forms a bond to $A_2$ of another monomer unit; and
each $A_3$ is independently a hydrogen, or forms a bond to $A_1$ of another monomer unit.

2. The crosslinked polydithiocarbamate of claim 1, which is

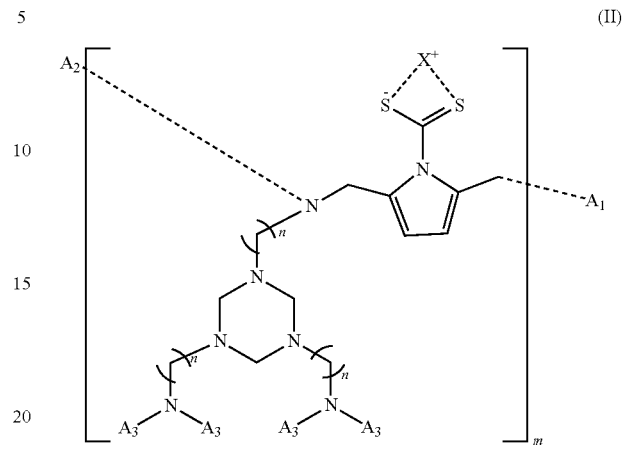

(II)

or a salt thereof, a solvate thereof, or a mixture thereof;
wherein, X is an alkali metal cation;
n is a positive integer in the range of 2-10;
m is a positive integer in the range of 2-10000;
$A_1$ forms a bond to $A_2$ of another monomer unit; and
each $A_3$ is independently a hydrogen, or forms a bond to $A_1$ of another monomer unit.

3. The crosslinked polydithiocarbamate of claim 1, wherein X is K.

4. The crosslinked polydithiocarbamate of claim 1, which exhibits a semi-crystalline structure.

5. A method of synthesizing the crosslinked polydithiocarbamate of claim 1, comprising:
reacting a diaminoalkane of Formula (V)

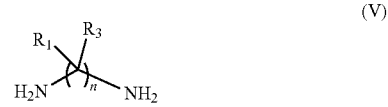

(V)

or a salt, solvate, tautomer or stereoisomer thereof, with a pyrrole compound of Formula (VI)

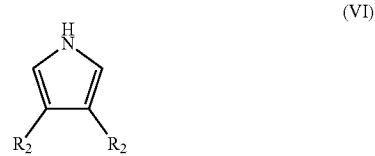

(VI)

or a salt, solvate, tautomer or stereoisomer thereof, and paraformaldehyde to form a crosslinked polymeric resin, wherein:
$R_1$ is selected from the group consisting of a hydrogen, an optionally substituted alkyl, an optionally substituted cycloalkyl, an optionally substituted aryl, and an optionally substituted arylalkyl,
$R_3$ is selected from the group consisting of a hydrogen, an optionally substituted alkyl, an optionally substituted cycloalkyl, an optionally substituted aryl, and an optionally substituted arylalkyl, each $R_2$ is independently selected from the group consisting of a hydrogen, an optionally substituted alkyl, an optionally substituted cycloalkyl, an optionally substituted alkoxy, an optionally substituted aryl, an optionally substituted arylalkyl, an optionally substituted aryloxy, and a halogen, and n is a positive integer in the range of 2-16; and reacting the crosslinked polymeric resin with carbon disulfide in the presence of an alkali metal hydroxide to form the crosslinked polydithiocarbamate.

6. The method of claim 5, wherein a molar ratio of the paraformaldehyde to the pyrrole compound is in the range of 1:1 to 10:1.

7. The method of claim 5, wherein a molar ratio of the diaminoalkane to the pyrrole compound is in the range of 1:1 to 5:1.

8. The method of claim 5, wherein each $R_1$, $R_2$ and $R_3$ is a hydrogen, n is selected from 2, 4, 8 and 10, and wherein the pyrrole compound is pyrrole, and the diaminoalkane is at least one selected from the group consisting of 1,2-diaminoethane, 1,4-diaminobutane, 1,8-diaminooctane, and 1,10-diaminodecane.

9. A method for removing a heavy metal from an aqueous solution, comprising:

contacting the aqueous solution having an initial concentration of the heavy metal with the crosslinked polydithiocarbamate of claim 1 to form a mixture; and filtering the mixture to obtain a heavy metal loaded crosslinked polydithiocarbamate and an aqueous solution having a reduced concentration of the heavy metal compared to the initial concentration.

10. The method of claim 9, wherein the heavy metal is an ion of at least one heavy metal selected from the group consisting of Pb, Cd, As, Cu, Ni, Co, Mn, and Cr.

11. The method of claim 9, wherein the heavy metal is Cd(II).

12. The method of claim 9, wherein the aqueous solution has a pH in the range of 2 to 8.

13. The method of claim 9, wherein the initial concentration of the heavy metal in the aqueous solution ranges from 50 µg $L^{-1}$ to 5000 µg $L^{-1}$.

14. The method of claim 9, wherein the crosslinked polydithiocarbamate is present at a concentration in the range of 0.1-10 g per liter of the aqueous solution during the contacting.

15. The method of claim 9, wherein the crosslinked polydithiocarbamate is contacted with the aqueous solution for 0.1-24 hours.

16. The method of claim 9, wherein the crosslinked polydithiocarbamate is contacted with the aqueous solution at a temperature in the range of 20° C. to 80° C.

17. The method of claim 9, wherein the crosslinked polydithiocarbamate has an adsorption capacity in the range of 100-5000 µg of heavy metal per gram of the crosslinked polydithiocarbamate.

18. The method of claim 9, wherein greater than 30% of a total mass of the heavy metal is removed from the aqueous solution.

19. The method of claim 9, wherein each $R_1$, $R_2$, and $R_3$ is a hydrogen, and n is 2;

wherein the aqueous solution comprises Cd(II) and at least one additional heavy metal ion, which is an ion of at least one heavy metal selected from the group consisting of Pb, As, Cu, Ni, Co, Mn, and Cr, and wherein greater than 95% of a total mass of Cd(II) is removed from the aqueous solution.

20. The method of claim 9, further comprising:

treating the heavy metal loaded crosslinked polydithiocarbamate with an acid to desorb the heavy metal and form a regenerated crosslinked polydithiocarbamate; and using the regenerated crosslinked polydithiocarbamate to remove a heavy metal from an aqueous solution.

* * * * *